United States Patent [19]
Juster

[11] Patent Number: 5,724,406
[45] Date of Patent: Mar. 3, 1998

[54] CALL PROCESSING SYSTEM AND METHOD FOR PROVIDING A VARIETY OF MESSAGING SERVICES

[75] Inventor: Bernard G. Juster, Flushing, N.Y.

[73] Assignee: Ericsson Messaging Systems, Inc., Woodbury, N.J.

[21] Appl. No.: 216,105

[22] Filed: Mar. 22, 1994

[51] Int. Cl.$^6$ .......................... H04M 3/50; H04M 11/00; H04M 3/42

[52] U.S. Cl. .......................... 379/67; 379/71; 379/84; 379/88; 379/89; 379/93.14; 379/201; 395/2.79; 395/2.84

[58] Field of Search .......................... 379/67, 88, 89, 379/73, 71, 201, 207, 84, 93, 211, 94; 395/2.87, 2.84, 2.79

[56] References Cited

U.S. PATENT DOCUMENTS

| | | | |
|---|---|---|---|
| 4,625,081 | 11/1986 | Lotito et al. | 379/88 |
| 4,713,806 | 12/1987 | Oberlander | 370/358 |
| 4,747,127 | 5/1988 | Hansen et al. | 379/94 |
| 4,757,525 | 7/1988 | Matthews | 379/89 |
| 4,782,517 | 11/1988 | Bernardis et al. | 379/201 |
| 4,866,755 | 9/1989 | Hashimoto | 379/80 |
| 4,878,240 | 10/1989 | Lin et al. | 379/67 |
| 4,926,462 | 5/1990 | Ladd et al. | 379/67 |
| 4,961,217 | 10/1990 | Akiyama | 379/89 |
| 4,972,462 | 11/1990 | Shibata | 379/89 |
| 5,018,097 | 5/1991 | Kuhlmann | 395/680 |
| 5,036,533 | 7/1991 | Carter et al. | 379/230 X |
| 5,164,983 | 11/1992 | Brown et al. | 379/265 |
| 5,193,110 | 3/1993 | Jones et al. | 379/88 |

(List continued on next page.)

FOREIGN PATENT DOCUMENTS

WO 93/00775  1/1993  WIPO .

OTHER PUBLICATIONS

"Communications", *Computing Canada*, May 9, 1991.
"AT&T Voice Mail Service", *AT&T Technology*, vol. 5, No. 4.
"Voice Activated Message Handling System for ISDN", *Electrical Communication*, vol. 64, No. 1, 1990.
"Hybrid Adjunct/Applications Processors: Integrating Voice and Data in Public and Private Networks", *Telecommunications*, Jun. 1991.
"The Integration of Telephone and Computer Technology", *Telecommunications*, Jun. 1991.

*Primary Examiner*—Harry S. Hong
*Attorney, Agent, or Firm*—Nixon & Vanderhye P.C.

[57] ABSTRACT

A flexible, object-oriented call processor is employed in a wide range of messaging environments (e.g. voice messaging, facsimile mail, notification and electronic mail) to provide any number and type of messaging service. Call processing procedures can be changed or adapted to provide a new or different messaging service without rewriting large amounts of software or redesigning the messaging system. Various call processing primitives are established to perform various call processing services in a messaging application, with each to primitive performing a single operation. Sets of parameters are also defined for different types of call processing services and different subscribers. A service state table corresponding to a sequence of logical states is set up to provide the requested call processing service. Once a requested call processing service is identified in response to a subscriber call, the call processor executes the service logic in the corresponding service state table. Each primitive is associated with a state in the service state table and is a source of events from that state. Execution of each logical state invokes one primitive for transitioning to the next state in the state table. Using such primitives and parameters, call processing services may be configured and readily adapted without knowledge of specific operating system or application software. A unique layered software architecture called the call processing stack executes call processing services based on corresponding records of configured primitives and parameters. Each layer of the architecture performs dedicated tasks without specific knowledge of the functions of the other layers.

76 Claims, 21 Drawing Sheets

U.S. PATENT DOCUMENTS

| | | | |
|---|---|---|---|
| 5,199,062 | 3/1993 | Von Meister | 379/67 |
| 5,222,125 | 6/1993 | Creswell et al. | 379/67 |
| 5,255,305 | 10/1993 | Sattar | 379/201 |
| 5,311,576 | 5/1994 | Brunson et al. | 379/201 |
| 5,323,452 | 6/1994 | Dickman et al. | 379/201 |
| 5,333,266 | 7/1994 | Boaz et al. | 379/89 X |
| 5,349,636 | 9/1994 | Iribarren | 379/89 |
| 5,355,406 | 10/1994 | Chencinski et al. | 379/88 |
| 5,367,609 | 11/1994 | Hopper et al. | 395/2.87 |
| 5,375,164 | 12/1994 | Jennings | 379/88 |
| 5,455,854 | 10/1995 | Dilts et al. | 379/201 |
| 5,497,373 | 3/1996 | Hulen et al. | 379/89 X |

CALL PROCESSING SYSTEM AND METHOD FOR PROVIDING A VARIETY OF MESSAGING SERVICES

FIELD OF THE INVENTION

The present invention relates to a messaging system for servicing requests that finds particularly advantageous application as an adaptable, object-oriented call processing system that provides multi-media call processing services such as: VoiceMail and Voice Messaging, Facsimile Mail and Fax Messaging, Radio Paging including Wide Area Paging, Interactive Voice Response, Automatic Call Distribution, Operator Services, Short Message Services, Intelligent Network Service Integration, Electronic Mail, Electronic Document Interchange, Audiotext, and Automated Attendant.

BACKGROUND AND SUMMARY OF THE INVENTION

For purposes of the present invention, the basic transactional entity between a user and a system that provides multi-media, e.g., telephony-related, messaging services (hereafter the messaging system) is defined as a "call." A call is an interaction process between one or more external parties and the messaging system. Each call may request a call processing service which has been preprogrammed using a prescribed set of hardcoded procedures to be implemented by the messaging system in order to process the call from beginning to end. One example is conventional voice mail systems where a subscriber is assigned a voice mailbox (i.e. a specific address location in a large memory) and incoming calls are routed to and stored in the subscriber's voice mail box. The subscriber then retrieves the voice messages from his mailbox by dialling into the voice mail system and entering access and message retrieval codes in response to some sort of audible prompts from the system.

In such voice mail systems, the procedures for processing a voice mail call, (i.e., conversion of voice from the telephone network to digital format, storage of the voice information in the appropriate mailbox, retrieval of a message from the mailbox, conversion back to voice format, transmission of the voice message onto the appropriate telephone network channel, and the generation of various prompts/options) are written by a skilled programmer based on a specific set of specifications, protocols, and services. That programmer requires extensive knowledge of software programming including both operating system and application software languages, (e.g., UNIX and C), as well as knowledge of voice mail systems. Once the call processing procedures were established and coded, it was extremely difficult to change the way in which calls were processed or to adapt the voice mail system to handle different kinds of messaging information (e.g. facsimile messages) or provide new services (e.g. interactive voice response). In fact, to make these changes or adaptations, the call processing software for the voice mail system had to be completely rewritten by skilled programmers of the type mentioned above. Obviously, this is a laborious, inefficient, and costly process.

The present invention overcomes these drawbacks by providing a flexible, object-oriented call processor that may be used in a wide range of multi-media messaging environments (that include but are not limited to voice mail) to provide any number/type of messaging service. If a call processing procedure must be changed or an entirely new service is to be provided, the call processor of the present invention readily accommodates such a change without the need to rewrite large amounts of software or redesign the messaging or call processing design.

A call processing system in accordance with the present invention employs a call processing method for processing subscriber communications in a message handling system to provide a variety of different communications services. A set of call processing primitives is established to perform various call processing services in a messaging application, with each primitive performing a single operation. Sets of parameters are also defined for different types of call processing services and different subscribers.

The call processing service is configured using a group of parameters that is accessed by the set of call processing primitives for implementing that service. The group of parameters includes global service parameters which describe the service independent of any subscriber, subscriber specific parameters, general call processing variables, and one or more sets of voice prompts for the service, each voice prompt being actuable from a service state table via a corresponding primitive. A service state table that corresponds to a sequence of logical states is set up to provide the requested call processing service.

In response to a subscriber call, a call processing service is identified. To provide the service, the call processor executes the service logic in the service's corresponding state table. Each primitive is associated with a state in the service state table and is a source of events from that state. Execution of each logical state invokes one primitive for transitioning to the next state in the state table. One or more primitives may executed before transition to the next state, and significantly, other state tables may be executed from within a state.

Using these primitives and parameters, one advantageous aspect of the present invention is that the call processing system may be constructed and readily adapted without knowledge of a specific operating system or of a detailed application software. Another important advantage is that a nonprogrammer can modify selected services to adapt the messaging system to provide new/different services without having to rewrite software code. Modifications and adaptations are easily and efficiently accommodated by appropriate selection of the call processing primitives and parameters. Thus, the present invention is particularly well suited to multi-media communications services.

The call processing system processes calls from a variety of external multi-media (e.g., telephony) environments and includes several software managers. A front end manager interfaces with and receives call processing service requests from external multi-media environments. A channel manager manages communications channels in the external multi-media environments and transmits call processing service requests for particular communication channels received from the front end manager. A call processing manager receives call requests from the channel manager and executes a logical sequence of call processing primitives to perform a requested call processing service, (each primitive performing a single call processing operation). The channel manager returns the processed call request to the front end manager which delivers the service over the subscriber's communication channel.

As described above, the call processing manager includes a service state table that corresponds to a sequence of logical states for providing the requested call processing service. Execution of each logical state invokes at least one primitive for transitioning to the next state in the state table. In addition, the channel manager includes a thread for each channel, and the management of each channel is governed by a state table definition.

The call processing manager also includes a phrase table for storing a variety of voice prompts associated with a call processing request with each voice prompt being defined by one or more phrases stored in the phrase table. Selected phrases are retrieved from the phrase table, and a desired voice prompt is activated in response to execution of a call processing primitive.

A layered software architecture called the call processing stack executes call processing services based on corresponding records of configured call processing primitives and parameters. The call processing stack may be viewed as a "user agent" between the telephone and other communication networks and the message handling and storage system. Call processing primitives are used to interact with the communication network and/or the message handling system. Execution of a call processing service by way of configured service state tables, CPPs, etc. resides in a highest layer referred to as a call processing manager (CPM). The CPM layer defines the call processing service initialization and execution environment including the call is processing primitives, state table compilation and execution, phrase table compilation and execution, and call "thread" activations. A next telephony channel manager layer includes multiple TCM threads which are each responsible for the operation of an associated telephony channel. Each TCM thread executes a command on its associated channel received from the CPM layer and passes it through to a next lower telephony front end layer. It also accepts events related to that channel from the telephony front end layer and posts them to the call processing managing layer. The telephony front end layer cooperates with specific telephony front end software controllers and, based on a collection of generic function commands received from the telephony channel manager level, provides the appropriate interface with the external telephony environment.

These and other features and advantages of the invention will be readily apparent to one of ordinary skill in the art from the following written description in conjunction with the drawings.

DETAILED DESCRIPTION OF THE INVENTION

In the following description, for purposes of explanation and not limitation, specific details are set forth, software flow charts, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

The flow chart diagrams used to describe the present invention provide a detailed description of the processing steps executed by data processing circuitry. By way of simple analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available computers is a routine step for a person skilled in the programming arts.

Figure 1:
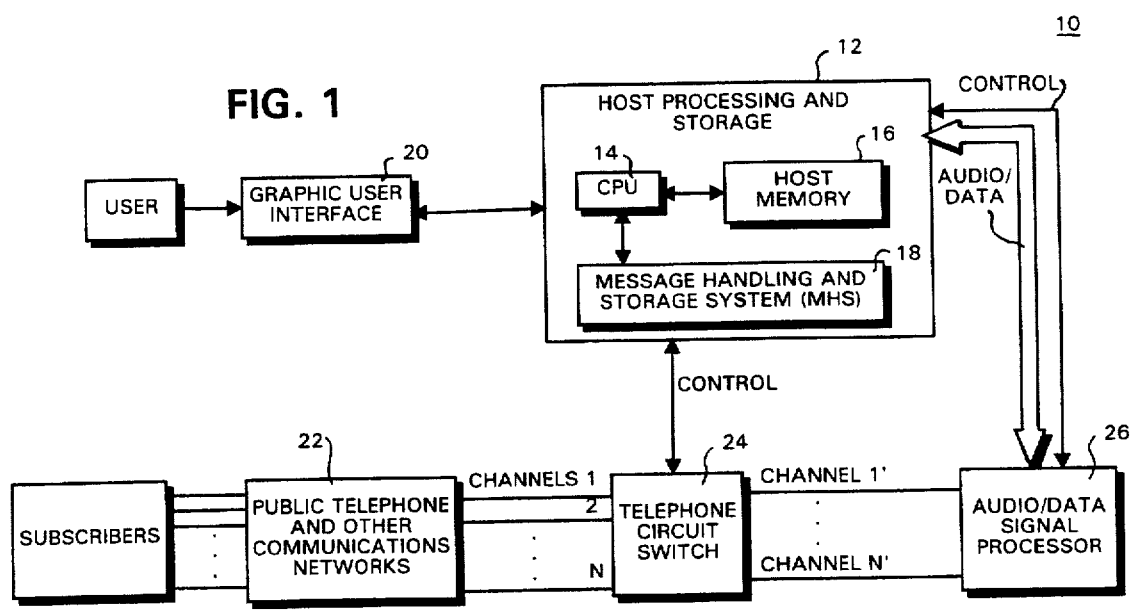
FIG. 1 is a function block diagram showing the multi media messaging system in accordance with the present invention.

The multi-media messaging system in accordance with the present invention is shown in FIG. 1 at reference numeral 10. A host processing and storage unit 12 provides the various call processing services described in more detail below and includes generally a host central processing unit (CPU) 14, program and data host memories 16, and a message handling and storage system (MHS) 18 which includes large capacity memory, i.e. disk storage. The host CPU 14 may be for example the 670MP SUN central processing unit available from Sun Microsystems. A graphical user interface (GUI) 20 connected to the host 12 permits a user to define and generate a messaging application using a variety of basic application building blocks, i.e. call processing primitives, parameters, variables, and phrases, described in more detail below.

Various subscribers to services provided by the messaging system 10 access the messaging system 10 over a variety of communications networks 22 such as the public switched telephone network (PSTN). Other communications networks such as integrated services digital network (ISDN) are also supported. Each subscriber accesses the messaging system 10 on a channel (e.g. hardwire, optical link, frequency, time slot, etc.) appropriately formatted in accordance with conventional protocols, (e.g. time division multiplex) through a telephone circuit switch 24 such as a private branch exchange (PBX) or private automatic branch exchange (PABX). Control signals from the host 12 determine which public channels (I–N) from networks 22 are connected to internal channels (T–N') processed by audio/ data signal processor 26. Under control of the host 12, audio and data information received by the audio/data signal processor 26 is processed to convert that information into a uniform format employed by the host 12. The host 12 then provides the requested services in accordance with call processing techniques to be described below and returns appropriate information and/or voice prompts to the subscriber via return path through the audio/data signal processor 26, telephone circuit switch 24, and communications networks 22.

Figure 2:
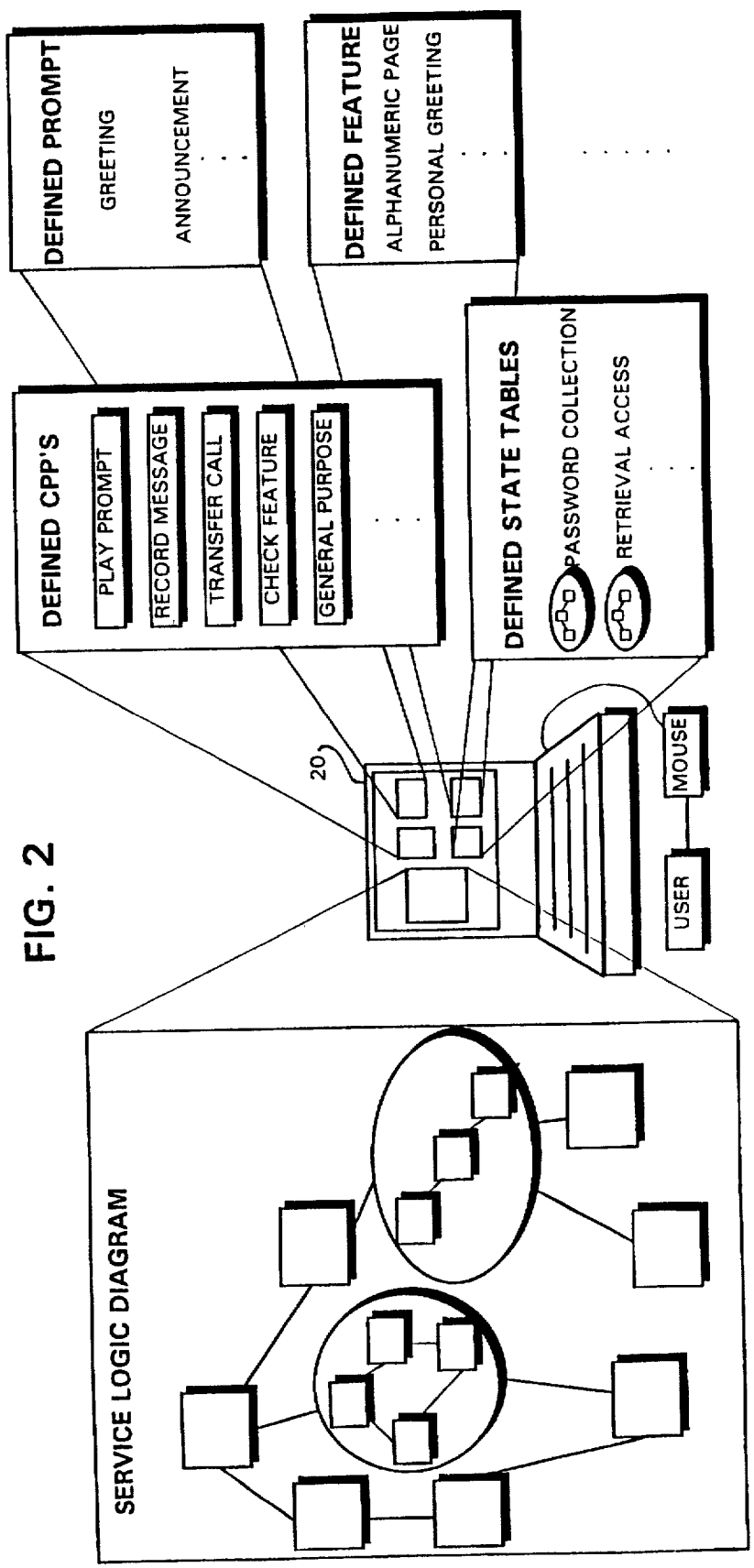
FIG. 2 is an overview of how the call processing system may be used to define a call processing service in accordance with the present invention.

Various call processing "building blocks" are used to process subscriber service requests. The call processing service resources of the multi-media messaging system 10 are presented to a user (i.e., a user is an operator of messaging system 10 as opposed to a subscriber to the system's services) via user interface 20 as a collection of call processing primitives (CPPs). As shown in FIG. 2, the graphical user interface 20 employs a mouse/icon environment with icons representing the CPPs to provide a non-technical, user-friendly environment that allows easy construction/modification of call services by a nonprogrammer. For example, a user develops a voice mail messaging application having the necessary voice prompts and DTMF responses by selecting appropriate CPPs that generate those prompts and tone responses.

Each CPP performs one simple identifiable operation, such as recording a message, playing a prompt, collecting a digit, reading DTMF sequences, etc. Therefore, a call processing service is a particular utilization of the messaging system's call processing primitives to offer one or more messaging services to potential subscribers. Because the CPP's are the basic building blocks for defining a messaging service, they are divided into CPP classes. The CPPs in a class relate to a common aspect of call-processing, e.g. digit collection, telephony, subscriber database access, message handling, etc. Each class has a three-letter acronym, and all its CPP's are coded in a common memory module in a software layer later described in more detail with respect to a call processing management layer (CPM layer) in FIG. 4.

Each CPP is implemented as a programming function, e.g. a "C" function using the C programming language, that can be executed by a suitable instruction execution means (i.e. the host CPU 14) and a data structure which serves as a descriptor for the CPP. However, this programming function is "invisible" to the user who simply configures a service using the primitives themselves. CPP descriptors are used by a state-table compilation and execution engine and include among other things (1) the CPP name, (2) information concerning the list of all the possible values the CPP can accept as arguments, and (3) the list of all possible events (results) the CPP can return when that CPP's execution is completed.

Figure 3:
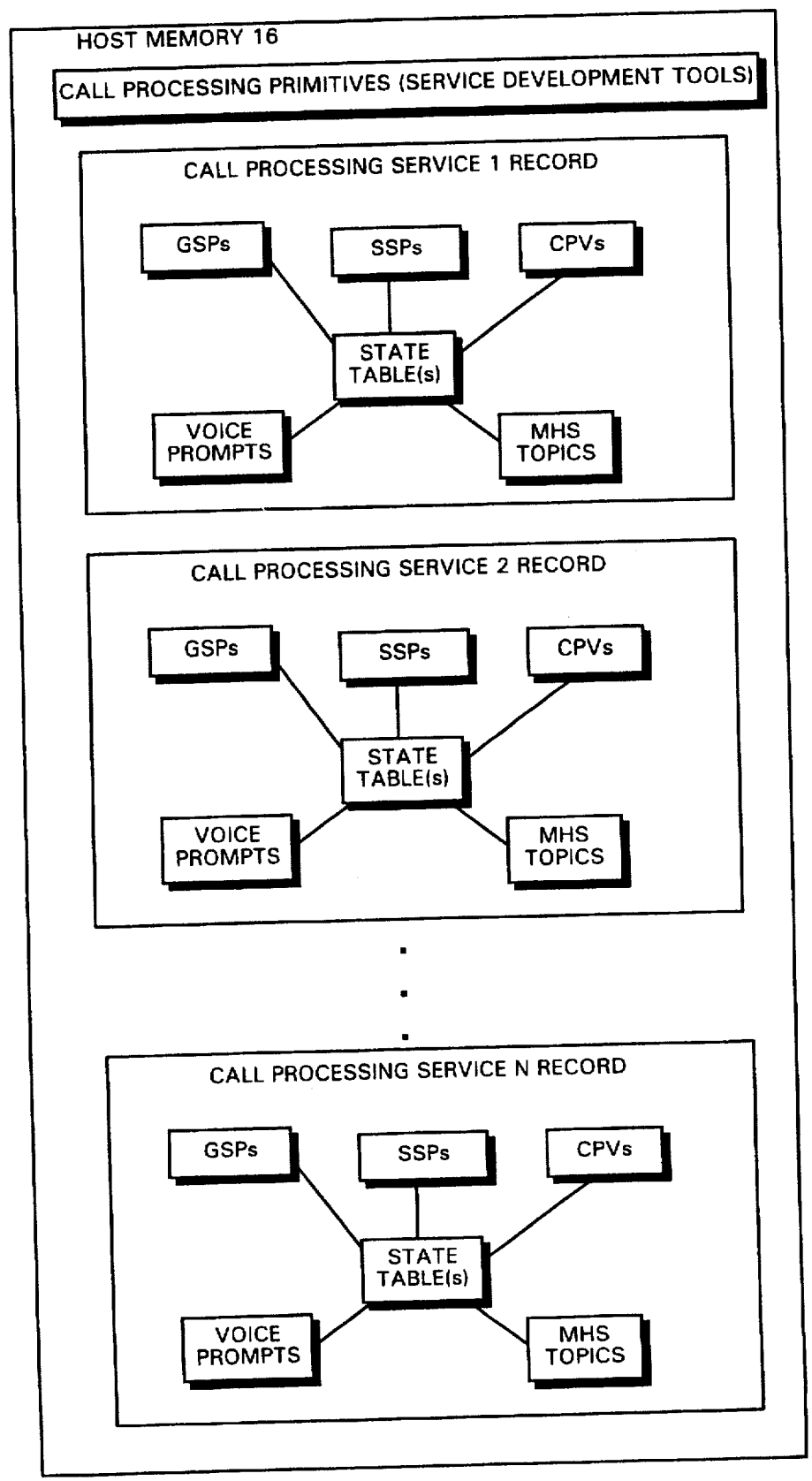
FIG. 3 is a block diagram illustrating symbolically the configuration of host memory 16 with respect to various call processing service files.

The definition of a call processing service also includes a number of database component definitions: Global Service Parameters (GSPs); Subscriber-specific Service Parameters (SSPs); Service Logic or Service State-Table (STB); Call-processing Variables (CPVs); Message Handling System Topics (MHS TOPICS); and Voice Prompts or Phrase Tables. These call processing service definitions are represented for each service by a set of database files in the messaging system. FIG. 3 illustrates some of the data structures stored in the host's data memory 16. Memory is separately allocated for the CPPs which are the basic service development tools. Each call processing service designed by a user is stored as an addressable service record/file in memory 16. Each configured service record includes user defined GSPs, SSPs, CPVs, MHS Topics, voice prompts and state table(s). The host CPU 14 scans the service files at initialization, and for each configured service, processes the files and parses them into appropriate data structures for execution by calls. A more detailed description of this process is provided below.

The Global Service Parameters (GSP) in a call processing service file includes the structural description of all the parameters which are unique to a messaging service, but are not subscriber-specific. Examples are the default language, the password length, the maximum duration of a call, etc. The actual values of a GSP are stored in the GSP field in the messaging service's record/file in a service database where each service record/file (such as an ASCII file) contains one GSP field (a long binary string of octets) that contains the values of the global service parameters. The user can define as many GSP parameters as can fit in the GSP field of the service record. A user assigns a name and a type for each GSP. During service execution, the call-processing primitives can access these GSPs.

Each parameter defined in a GSP file can be of one of the following types:

1) Integer: a general-purpose 32-bit integer value. An integer is defined in the GSP file via the keyword ".integer" followed by the particular GSP name.

Examples

.integer MAX_CALL_TIME {Maximum duration of a call in seconds}

.integer MAX_PSWD_RETRIES {Maximum number of password retries}

.integer PSWD_SIZE {Password length in digits}

2) Counter: a 32-bit counter. There are dedicated CPP's which perform operations on counters, such as increment, decrement, load, reset, set maximum, set minimum, check maximum, check minimum, check zero, etc. A counter is defined in the GSP file via the keyword ".counter" followed by the counter name.

Example

.counter YTD_CALL_CNT {Year-to-date # of calls to this service}

3) Flag: A boolean value which can have the values YES or NO. There are dedicated CPP's which perform operations on flags, such as set to YES, set to NO, check, etc. A flag is defined in the GSP file via the keyword ".flag" followed by the flag name.

Example

.flag SVC_ENABLED; {Global service enabled/disabled flag}

4) Date: This variable type expresses a calendar date. There am dedicated CPP's which perform operations on dates, such as compare, set date for today, etc. A date is defined in the GSP file via the keyword ".date" followed by the date name.

Example

.date ANN_1_EXP; {Date of announcement #1 expiration}

5) Time of Day: Expresses a time of day in minutes. There are dedicated CPP's which perform operations on time-of-day variables, such as compare to current time, etc. A time-of-day parameter is defined in the GSP file via the keyword ".time of day" followed by the parameter name.

Example

.time_of_day PM_GRTG; {Time to switch to the afternoon greeting}

6) Amount: Similar to integer, used to express money amounts in units of the smallest unit in the relevant currency (e.g. cents in U.S. currency). There are dedicated CPP's which perform operations on amount variables. An amount parameter is defined in the GSP file via the keyword ".amount" followed by the parameter name.
Example .amount MAX_CHKG_XFER; {Max. transfer amount from checking acct.}

7) Enumerated value: This type of GSP is a used for parameters that can accept a finite number of logical values. There are dedicated CPP's which perform operations on enumerated variables. An enumerated GSP is defined in the GSP file via the keyword ".enum" followed by the parameter name, then the list of possible values separated by commas between angular brackets.
Example .enum DEF_LANG <ENGLISH, SPANISH>; {Default language}

8) String: A character string of arbitrary length. There are dedicated CPP's which perform operations on strings, e.g. compare, clear, concatenate etc. A string parameter is defined in the GSP file via the keyword ".string" followed by the parameter name.
Example .string DEF_ALPHA_MSG {Default alphanumeric pager message}

The Subscriber-specific Service Parameters (SSP) in a call processing service file includes the structural description of all the subscriber-specific parameters which can vary from subscriber to subscriber. Examples are the subscriber's features, the maximum voice message length for a subscriber, the subscriber's current number of messages, etc. The actual SSP values are stored in the SSP field in each service file/record in the subscriber database. The user assigns a name and a type for each parameter. The call-processing primitives can access these parameters, allowing the user to utilize them in the Service Logic (state-table).
Examples:

| | | |
|---|---|---|
| .flag | PERS_GRTG; { personal greeting feature } | |
| .flag | NOTIFICATION; { Paging notification feature } | |
| .integer | MAX_MSG_SIZE; { Max. voice message duration in seconds} | |
| .enum | PAGER_TYPE <TONE, NUMERIC, ALPHANUMERIC>; { Pager type} | |
| .string | PASSWORD; { Subscriber password } | |
| .string | NOTIF_MSG; { Paging notification message } | |
| .enum | SUBSCR_LANG <ENGLISH, SPANISH>; { Subscriber-language } | |

The Call-processing variables (CPV) are general-purpose auxiliary variables which can be defined as part of the service definition and accessed by the call-processing primitives. The user assigns a name and a type for each variable. The call-processing primitives can access these CPVs by name which enables their use in the Service Logic (state-table). The CPV variables values for a given call are stored in the call processing service file. The definition of all the call-processing variables is included in the service's CPV file which is processed by the system at initialization time. An example of a CPV is timer defined in the CPV file via the keyword ".timer" followed by the timer name. There are dedicated CPP's which perform operations on timers, such as start, stop, load (with a GSP or SSP integer), check expired, etc.

Example

| |
|---|
| .timer CALL_TIMER;{overall call duration timer. Loaded at the} {beginning of each call with the MAX_CALL_TIME} {GSP parameter (from a previous example)} |

The Service State Table is the principal component of the service definition. It represents the logical progression and execution of the call from beginning to end by means of states. Each state invokes one CPP and describes the transition to the next state based on the outcome of the CPP execution. Additionally, one or more CPP(s) may be executed before the transition to the next state, and significantly, another state-table can be executed from within a state just like a single CPP. This allows nesting of state-tables and creation of libraries of predefined state tables which can treated as individual CPPs. The service logic definition is represented by an ASCII file which can contain one or more state table(s).

In general, state tables present an application's logic in a simple, easy to follow manner. To this end, each call processing/messaging service application in the present invention is broken up into call processing primitives which take a common calling sequence and which return events. A CPP is attached to each state and is the source of events. There is a separate set of possible events for each CPP and hence for each state. Using the CPP as a source for events has a number of advantages over using a single event queue. First, unwanted asynchronous events can be ignored until the finite state machine is in an appropriate state for handling them. Second, several sources of events may be used without difficulty. Third, "generated" events which reflect what happened when an action was attempted are handled in a natural way.

The service state table syntax provides a simple parser. Every parameter "name" is introduced by a special character which specifies the type of name to follow:

{ Open comment

} Close comment

[ Open a state table name (at definition)

] Close a state table name

@ Open a state label name

* Used in place of @ to flag a state label as a "major" state.

: Close state label, open CPP name ( Close CPP, open parameter name. The parameter name is interpreted in the context of the CPP.

) Close parameter name

< Open event name. The event name is interpreted in the context of the CPP.

> Close event name, open destination state

; Close destination state name

. End of state table. Characters after the '.' are completely ignored. The period is required simply to be certain that the source was not truncated.

Note: Blank, TAB, CR, LF, FF are ignored except in a name, and CR, LF, and '{' are illegal inside a comment. All other characters are legal inside a comment.

The following is a simple general example of two inter-related state tables, followed by several call-processing examples:

```
{last_modification_date/time}
[state_table_A,context_typedef_name]
    *state_1: primitive_A(parameter_name)
        < event_name_A > state_1;
        < event_name_B > state_2;
        < event_name_C > 1;
    @1: primitive_B(parameter_name)
        < event_name_A > state_1;
        < event_name_B > 2;
    @2: primitive_C()
        <>3;
    @3: return(event_A)
    @state_2: return(event_B)
[state_table_B,context_typedef_name]
    *state_1: primitive_D(parameter_name)
        < event_name_A, primitive_x(parameter_name),
primitive_y(parameter_name) > state_2;
        < event_name> 1;
    @1: primitive_E(parameter_name)
        < event_name > state_1;
        < event_name > state_3;
    @state_2: state_table_A()
        < event_A > state_2;
        < event_B > state_4;
    @state_3: return(NORMAL)
    @state_4: return(ABNORMAL)
```

This example illustrates several typical situations: state_1 in state_table_A is a typical state where the CPP primitive_A is executed. The CPP can return 3 possible events: event_name_A, event_name_B and event_name_C. The occurrence of one of these events will lead to a transition to state state_1, state_2 or 1 (accordingly).

An additional feature of the STB language can be observed in state_1 in state_table_B. One or more CPP(s) may be executed before the transition to a new state after the event leading to the new state has been returned by the state's CPP. Such a CPP is called a pre-transition CPP. In the example, assuming primitive_D returned event_name_A, the system will execute primitive_x and primitive_y before it switches to state_2. In the case when a CPP is executed as a pre-transition action, the event returned is ignored. In state_2 of state_table_B, state_table_A is executed instead of a CPP. This is an example of nested state table execution.

The more specific call processing examples follow:
Example 1

```
@START_CALL: ton_ringback(NORTH_AMERICAN_1_RING)
{issue ring-tone}
    <TONE_COMPLETE>CONTINUE_CALL;
    <HANGUP, tel_hangup()>EXIT_CALL;
```

In this example, the CPP ton_ringback is executed. It has two possible outcomes-either the ring tone was completed or the caller hung-up beforehand. In the latter case, the system first executes the CPP tel_hangup( ) and then switches to the state EXIT_CALL.
Example 2

In the following state, the system will access the SSP field of the subscriber's record in the subscriber database and examine whether the PERSONAL_GREETING flag is set.

```
@INITIAL_GREETING: ssp_flag_check(PERSONAL_GREETING)
    <YES >CHECK_IF_GREETING_AVAILABLE;
    <NO >PLAY_STANDARD_GRTG;
Example 3.
@INIT_PSWD_RETRIES: cpv_ctr_reset(PSWD_RETRY_COUNT)
    <SUCCESS >COLLECT_PASSWORD;
@COLLECT_PASSWORD: COLL_PSWD()
```

```
    <COMPLETE >CHECK_PASSWORD;
    <HANGUP >EXIT_CALL;
@CHECK_PASSWORD: ssp_str_dgb_cmp(PASSWORD)
    <EQUAL >START_RETRIEVAL;
    <NOT_EQUAL, cpv_ctr_incr(PSWD_RETRY_COUNT)
>PSWD_INVALID;
@PSWD_INVALID: cpv_ctr_gsp_cmp(PSWD_RETRY_COUNT)
    <LESS >COLLECT_PASSWORD;
    <EQUAL >GOODBYE;
    <GREATER >GOODBYE;
```

In the first state, the call-processing variable counter PSWD_RETRY_COUNT, which keeps track of the number of unsuccessful password entries, is reset to zero. In the second state, COLL_PSWD is another state table (not shown) which is called here as a CPP. If the user did not hangup, the call proceeds to the next state which checks if the entered password is valid by executing the CPP ssp_srt_dgb_cmp, which compares the string in a digit-collection buffer to a string in the subscriber database (SSP) which is the subscriber's password. If the entered string does not match the subscriber's password (NOT_EQUAL), the system switches to the PSWD_INVALID state, but not before the unsuccessful attempt counter is incremented (cpv_ctr_incr(PSWD_RETRY_(COUNT)). In the last state, the CPP cpv_ctr_gsp_cmp compares the current retry counter to the maximum allowed, which is the global service parameter PSWD_RETRY_COUNT. If less, the caller gets another chance at re-entering the password by switching back to the state COLLECT_PASSWORD. Otherwise, another state will be activated (not shown) in which the system will probably inform the caller of his failure and terminate the call.

Message Handling System (MHS) Topics (TOP) are the user-definable part of the MHS "key." The MHS key is the software mechanism/object used to access and retrieve any message stored in the message handling system, i.e., on magnetic disk in messaging handling and storage 18. Message handling operations (e.g. storage and retrieval of messages to/from messaging handling and storage 18) are performed by host CPU 14 using message managing software. Since each service may define different ways to classify messages into subjects, types, sub-types etc., the user is provided with a capability to define custom topics in addition to the pre-defined keys used to access messages in the MHS. These keys can be accessed by the call-processing primitives, allowing the user to utilize them when defining the service logic (state table).

Each topic is represented by one character in the space within the key which is reserved for user-definable topics. The user can define as many topics as can fit in the TOP field of the MHS key. The definition of all the topics is included in the service's TOP file which is compiled at system initialization. There are dedicated CPP's which perform topic operations such as selecting the topic. Each topic is defined in the TOP file in the following form:

.topic topic_name <topic_value_1, topic_value_2. . . . >;

Example: assume a voice mail service which accepts personal greetings in 2 languages:

```
.topic MSG_TYPE <VOICE_MSG, GREETING>
.topic GREETING_LANG <ENGLISH, SPANISH>
```

The first topic expresses whether an MHS message (associated to the service) is a regular voice-mail message or a personal greeting. The second topic is relevant only if the message is a personal greeting (i.e. the MSG_TYPE topic has the value GREETING), and it expresses whether the personal greeting is in english or spanish.

It is desirable for many call processing services to employ voice prompts. To satisfy a user and subscriber base as large and diversified as possible, a user may define one or more sets of voice prompts for each service, where each voice prompt is a logical prompt which can be activated from a service state-table by invoking an appropriate CPP. Each such set of voice prompts is called a phrase table. The way a prompt actually sounds to the human operator is defined in the phrase table. It can be any combination of simple phrases or more complex phrases which are derived from certain variables. A service may include several phrase tables based on criteria which are defined by the user (e.g. language). Therefore, each service includes its own set of prompts, and all the prompts are defined in one or more phrase table(s). Each voice-prompt is given a name VP_xxx and is defined as a combination of one or more building block(s) of the following types:

1) Simple Phrase: Simple phrases are basic, raw-materials for generating voice prompts and they consist of spoken sentences, phrases or words that can be used alone or in combination with other phrases. Simple phrases are assigned unique names when the phrase-table is created (of the form SP_xxx) for purposes of referencing them in the phrase table.

Examples

SP_CAD "Customized announcement deleted"

SP_MSGRCV "This message was received on"

SP_1 "One"

SP_1_F "One (final word)" {i.e. at the end of a sentence}

2) Silence Phrase: Silence phrases allow the specification of precise amounts of silence to be generated when waiting for a response, etc. Silence phrases can generate silence in increments of milliseconds and are referenced as TN_SILENCE n where n is the number of milliseconds of silence desired Example TN_SILENCE 1200 {1.2 second silence}

3) Tone Phrase: Tone phrases allow the specification of tones of precise frequency, amplitude and duration. Tone phrases are referenced as TN_TONE x,y,z where x is the duration in milliseconds, y is the frequency in Hertz and z (optional) is the amplitude in decibels.

Example

TN_TONE 500,400 {0.5 seconds 400 Hz, use default amplitude}

4) Action Phrase: Action phrases (and tabular phrases—described below) are the mechanism by which system variables such as subscriber parameters, message arrival time, global service parameters, etc. are accessed. The inclusion of an action phrase within the definition of a prompt will result in a software function being executed. This function usually loads one or more values in a phrase-execution data area of host memory based on one or more variable(s) it examines. The action phrases have the form AP_xxx(parameter_name) and are part of the messaging system (as opposed to simple phrases created by the user).

Example

AP_GSP_INT(PASSWORD_LENGTH) {Fetch the password length}

This phrase fetches an integer variable called PASSWORD_LENGTH from a service's global service parameters (GSPs) and loads it in the "integer" area in the phrase subsystem's workspace.

5) Tabular Phrase: Tabular phrases, similar to action phrases, are action routines (i.e. functions), that return a numeric value which is used as an index to a table determining the next phrase to be executed. A tabular phrase is usually invoked after an action phrase which prepared the groundwork for its execution.

Example

TP_INTEGER( )

SP_NULL {no "zero" in this example}

SP_1 "One"

SP_2 "Two"

SP_3 "Three"

SP_4 "Four"

SP_5 "Five"

SP_6 "Six"

SP_7 "Seven"

SP_8 "Eight"

This phrase causes the number (between 1 and 8) stored in the "integer" area in the phrase subsystem's workspace to be spoken as part of a prompt.

Example

TP_MONTH( )

SP_JAN "January"

SP_FEB "February"

SP_MAR "March"

SP_APR "April"

SP_MAY "May"

SP_JUN "June"

SP_JUL "July"

SP_AUG "August"

SP_SEP "September"

SP_OCT "October"

SP_NOV "November"

SP_DEC "December"

This phrase "speaks" the value stored in the "month" area in the phrase subsystem's workspace.

4) Compound Phrase: A compound phrase is a list of simple phrases, silence phrases, action phrases, tabular phrases or other compound phrases that permits complex voice prompts to be constructed. A compound phrase (CP_xxx) has the same structure as a voice prompt (VP_xxx). The only difference is that a VP is the main entity which can be referenced in the service state-table and a CP is internal to the phrase table. The following examples illustrate the use of the different phrase types.

Example 1

Assume one of the global service parameters (GSP), PSWD_LENGTH, is the password length for callers which can be anywhere from 4 to 8 digits. The service definition includes a requirement for a voice prompt of the following form: "Please enter your ( . . . )-digit password now," followed by six seconds of silence. This VP can be defined as follows:

VP_ENTPSWD

SP_PLSENT "Please enter your"

AP_GSP_INT(PSWD_LENGTH) { fetch the password length }

TP_INTEGER()

SP_NULL { "zero" not allowed in this example }

SP_NULL { "one" not allowed in this example }

SP_NULL { "two" not allowed in this example }

SP_NULL { "three" not allowed in this example }

SP_4 "Four"

SP_5 "Five"

```
    SP_6 "Six"
    SP_7 "Seven"
    SP_8 "Eight"
    SP_DPS "digit password now"
    TN_SILENCE 6000
```

Example 2

Assume one of the subscriber-specific parameters (SSP) of a service is the password expiration date, called PSWD_EXP, and a prompt should be defined of the form:

"Your password expires on <month>/<day>. Press '1' to renew it"

A possible definition for this prompt could be:

```
VP_PSWDEXP
    SP_PSWDEXP "You password expires on"
    AP_SSP_DATE(PSWD_EXP){fetch the exp. date from the database}
    CP_DATE_PLAIN_NOYEAR{say month and day-see definition below}
    SP_RENEW "Press one to renew it"
{ definition of CP_DATE_PLAIN_NOYEAR: }
CP_DATE_PLAIN_NOYEAR
    TP_MONTH() {The 'month' variable was loaded by AP_SSP_DATE}
        SP_JAN "January"
        SP_FEB "February"
        .
        .
        .
        SP_NOV "November"
        SP_DEC "December"
    TP_DAY() {The 'day' variable was loaded by AP_SSP_DATE}
        SP_1ST "First"
        SP_2ND "Second"
        .
        .
        .
        SP_20TH "Twentieth"
        CP_21ST { <--- Note: CP, not SP }
        CP_22ND
        .
        .
        .
        SP_30TH "Thirtieth" { This one IS a simple phrase }
        CP_31ST { <--- Note: CP, not SP }
{ Definitions for CP_21ST - CP_29TH and CP_31ST }
CP_21ST
    SP_20 "Twenty"
    SP_1ST "First"
CP_22ND
    SP_20 "Twenty"
    SP_1ST "Second"
    .
    .
    .
CP_29TH
    SP_20 "Twenty"
    SP_9TH "Ninth"
CP_31ST
    SP_30 "Thirty"
    SP_1ST "First"
```

The definition of CP_DATE_PLAIN_NOYEAR can be used by any other VP or CP which includes a date. It is one of the pre-defined compound phrases which is included in the messaging systems service-definition tools, together with many other phrases used to express dates, times, numbers, money amounts, etc. Any new phrase the user composes can be saved and used by any phrase in any phrase-table of any service. The phrase-table definition is very similar to the service's state-table definition, where action phrases and tabular phrases are similar to CPPs (call-processing primitives) and voice prompts and compound phrases are similar to state-tables. A final example illustrating the flexibility of the phrase-definition environment is the CP_DATE_YT_NOYEAR phrase, which would probably rather be used instead of CP_DATE_PLAIN_NOYEAR in the previous example:

```
CP_DATE_YT_NOYEAR
    TP_DATE_TODAY( )
        CP_DATE_PLAIN_NOYEAR
        SP_YESTERDAY "Yesterday"
        SP_TODAY "Today"
        SP_TOMORROW "Tomorrow"
        CP_DATE_PLAIN_NOYEAR
```

The tabular phrase TP_DATE_TODAY compares the currently stored date in the PHR workspace to today's date and returns the following values:

0 if the date is over one day earlier than today's date
1 if the date is one day earlier than today's date
2 if the date is equal to today's date
3 if the date is one day later than today's date
4 if the date is over one day later than today's date A service may have more than one phrase table, based on another component of a service definition which is the phrase category definition. An obvious example of a phrase category is language, where each phrase table represents a different language. Another example may be the user-level, i.e. a certain prompt will sound differently when issued to a "novice" caller than to an "expert" caller, etc. The definition of these phrase categories is part of the service definition, resulting in a separate phrase table for each combination the user finds suitable. Using the two above-mentioned examples, if a service supports the english, spanish and french languages and the "novice" and "expert" user-levels, the phrase categories definition might dictate that the user-levels be supported only in english and spanish. In this case the service definition will include five phrase tables: "Expert English", "Novice English", "Expert Spanish", "Novice Spanish" and "French".

Each category has a default value, so that at the beginning of a service execution, there is always an active phrase table. Each category's value can be modified via a CPP, so that the active phrase table can be changed any number of times during a call, as a result of examining a database variable, or as a result of the caller pressing a key etc., as defined in the service's state-talkie.

An entry in the service's phrase category file has the form:

.phr_cat category_name <value_name_1, value_name_2, ... >

Examples

.phr_cat LANGUAGE <CANTONESE, ENGLISH>
.phr_cat USER_LEVEL <NOVICE,INTERMEDIATE, EXPERT>
.phr_cat PROMPT_SIZE <NORMAL,SHORT>

The PROMPT_SIZE category might be used for example in an application where the system would select a phrase table with shorter prompts after detecting that a subscriber is calling at a high billing rate (such as long-distance or cellular).

These basic building blocks used to create a call processing service described above are stored (once they are created/configured by a user) in host memory. As shown in FIG. 3, the call processing primitives are stored in one area of memory 16, and each configured call processing service is stored as its own service record. Each service record includes its corresponding GSPs, SSPs, CPVs, Voice Prompts, MHS Topics, and State Table(s). These data structures dictate how a call service is to be performed when called.

Having defined the basic call processing building blocks, the operational aspects of the present invention are now described. The call processing operation is implemented using a layered software architecture referred to as a call processing stack with each of the principal layers in the stack shown in FIGS. 4(a) and 4(b). The operation of the present invention is often described in terms of software managers, software layers, servers, and/or modules. However, it will be understood by those skilled in the data processing ads that it is ultimately the host processor 14 that physically executes the requisite operations based on instructions provided by the software managers, layers, servers, and/or modules.

The call-processing stack in host memory 16 can be viewed as a "user-agent" between the telephone and other communications networks 22 and the message handling and storage system (MHS) 18. CPP's (call-processing primitives) are used to interact with the communication network(s) and/or MHS 18. A typical example is a CPP which plays back on the telephone line a recorded voice message stored in the MHS 18.

Figure 4A:
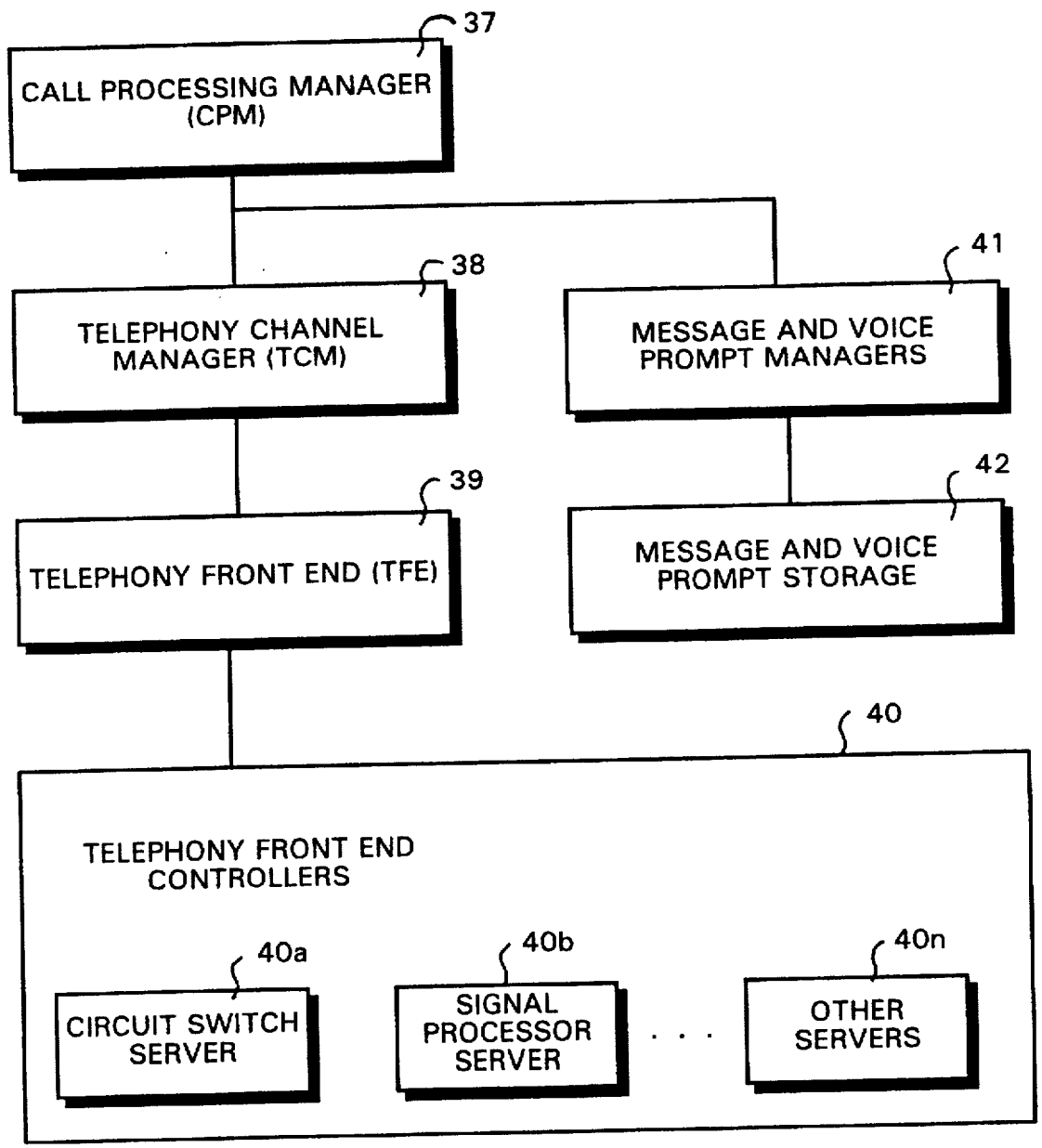
FIGS. 4(a) and 4(b) are function block diagrams illustrating the software architecture of the call processor in accordance with the present invention.
Figure 4B:
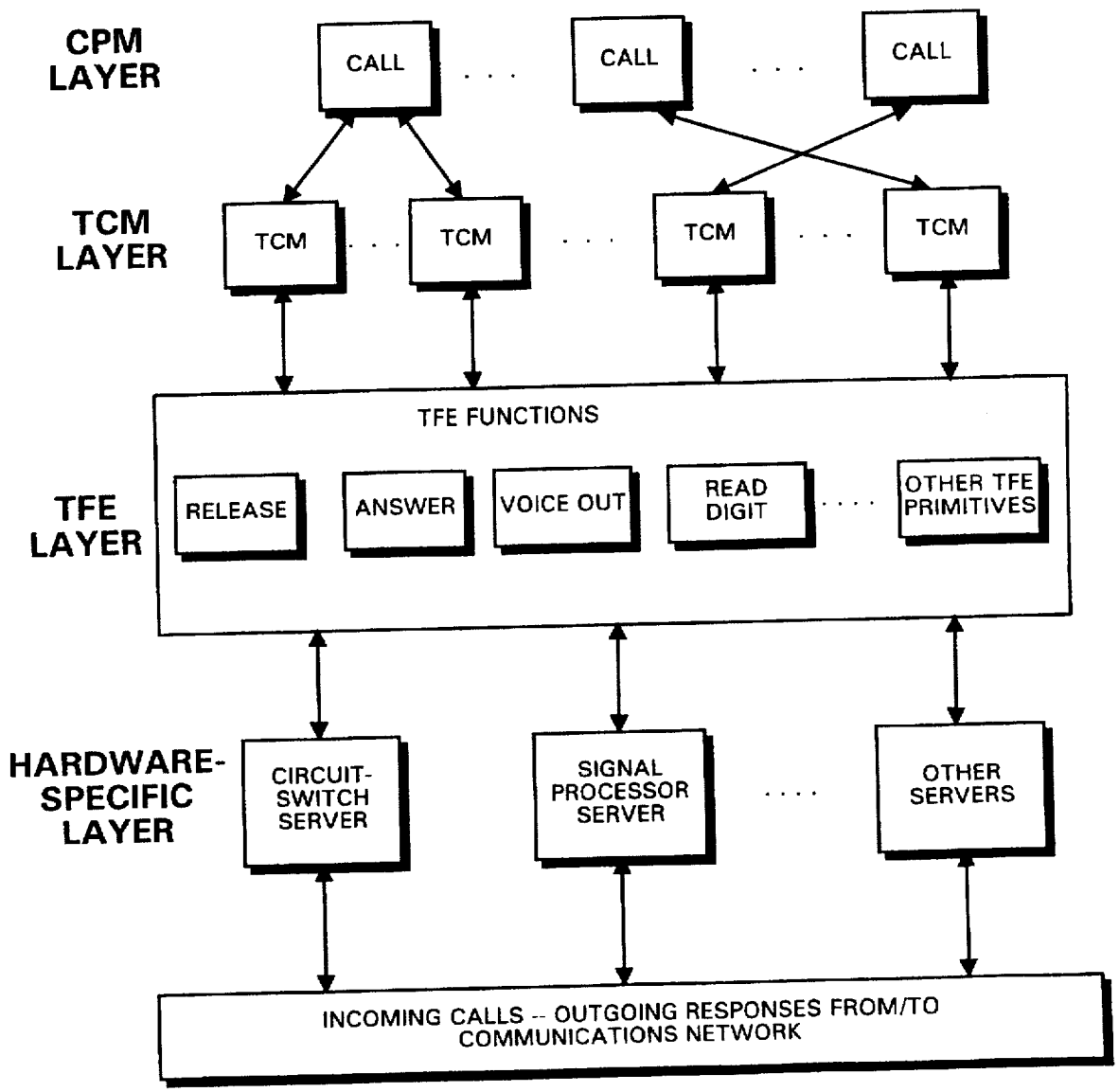

Referring to FIGS. 4(a) and 4(b), service execution by way of service state tables, CPPs, etc. as illustrated graphically in FIG. 3 resides in the highest layer of the call-processing software or "stack" and is referred to as a call-processing manager (CPM) 37. The CPM layer 37 defines the call-processing service initialization and execution environment, including the CPP's, state-table compilation and execution, phrase-table compilation and execution, and call thread activation all of which are described in more detail below. A thread is understood in the software/programming context to mean any task which is performed in parallel with another thread/task.

The Telephony Channel Manager (TCM) layer 38 includes multiple TCM threads as shown graphically in FIG. 4(b) as many individual TCMs, i.e. TCM threads. Each TCM thread is responsible for the operation of an associated telephony channel, including closing/opening the channel, executing a command on the channel received from the CPM layer 37 and passing it through a lower Telephony Front-End (TFE) layer 39, and accepting events related to the channel from the TFE layer 39 and "posting" them to the CPM layer 37.

The TFE layer 39 is a platform-oriented layer that "hides" the operational details of various TFE controllers 40 from the upper CPM and TCM layers. More specifically, the TFE layer 39 is a collection of TFE functions, e.g. release, answer, voice out, read digit, etc. shown in FIG. 4(b), used to interface with the external telephony environment. Beneath the TFE layer 39 is the hardware specific layer that in addition to hardware includes software server modules (40a ... 40n) specific to particular TFE controllers 40. Server module 40a corresponds to the circuit switch 24, server 40b to the signal processor 26, etc. These servers control their hardware's interface to the call processing stack and to the telephone lines that receive incoming call events and return call processed responses.

Figure 5:
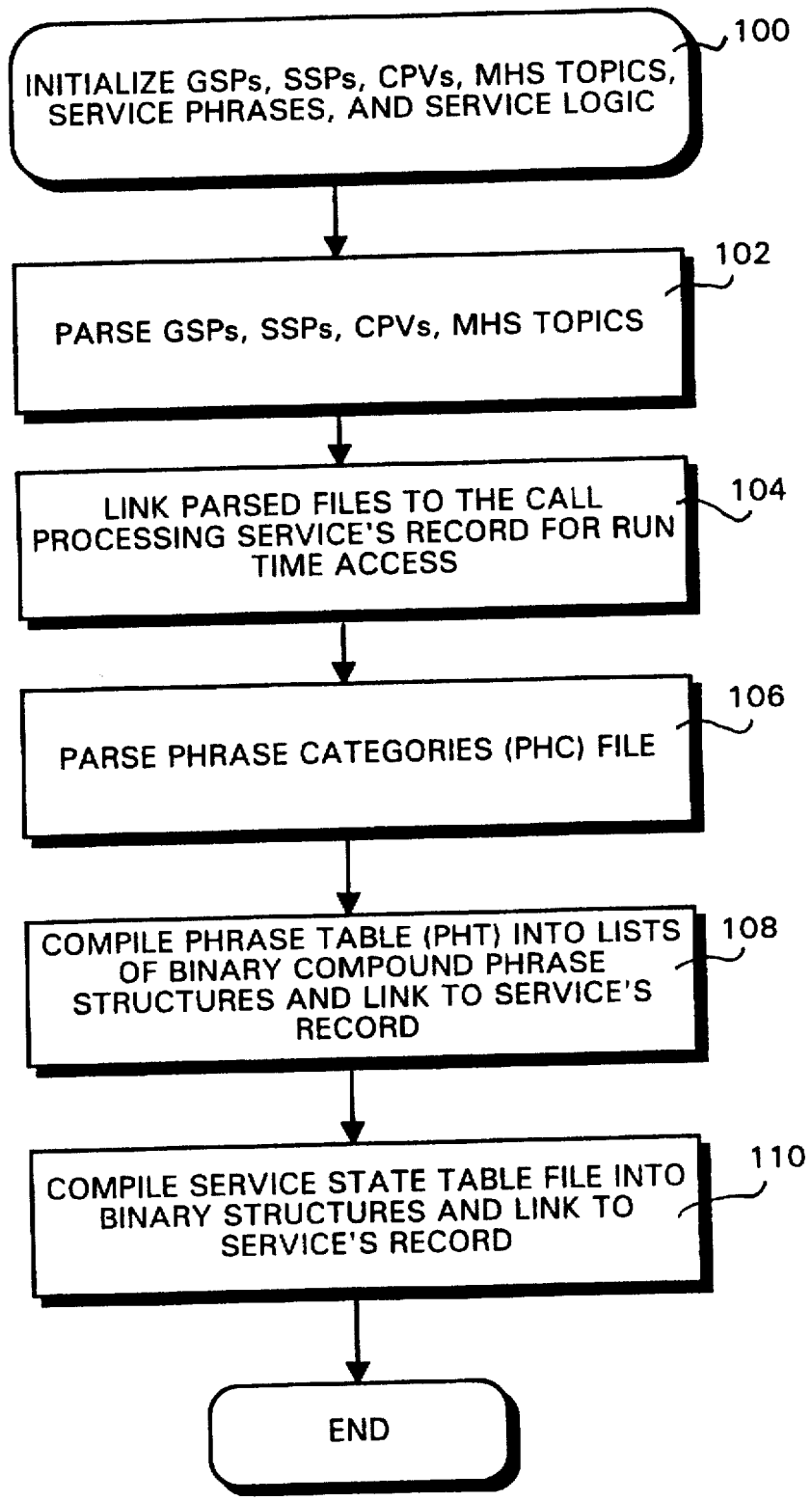
FIG. 5 is a software flow chart illustrating initialization procedures for the various parameters, variables, phrases and service logic used to provide call processing services in accordance with the present invention.

At system initialization, each configured CPP class is initialized, and the list of all the class CPP's is linked to the systemwide list of configured CPP's (shown in FIG. 3) which is then made ready to be used by the service initialization and execution modules. FIG. 5 illustrates in general flowchart form the initialization procedures beginning at 100. In steps 102 and 104, the particular service's GSP, SSP, CPV and TOP files are scanned and binary structures and tables are parsed and linked to the service's record. In steps 106 and 108, the service's phrase-table(s) are passed to generate binary phrase tables (PHT) for subsequent phrase execution engine and linked to the service's record in memory. In steps 110, the service's state-table (STB) file is compiled matching the tokens in the state table text against the CPP list, the GSP/SSP/CPV/TOP tables, the Voice Prompt tables, etc. The compilation generates binary structures defining the specific service logic which is then linked to the service's record. As described above, FIG. 3 illustrates call processing service records for 1, 2, ... N configured call processing services. Further description of initialization and compilation are provided later.

After initialization, all the configured services are ready to be executed via "calls." Calls can be outgoing or incoming. In both cases, a call starts by spawning a thread which causes execution to the service's state-table (STB) corresponding to that call. In the case of incoming calls, call processing is initiated by a channel's TCM after it receives a "Request for Service" message from the TFE layer 39 upon receipt of a call. The channel's default service is fetched from a TFE channel database. Each telephony channel has a corresponding record in a channel database where the channel's configuration parameters (e.g. electrical characteristics, etc.) are stored. One of the parameters is the service to be activated when a call is received on that channel. Then the call is spawned. In the case of outgoing calls, the same process occurs as a result of another triggering event such as a time of day or a new message, etc.

Figure 6:
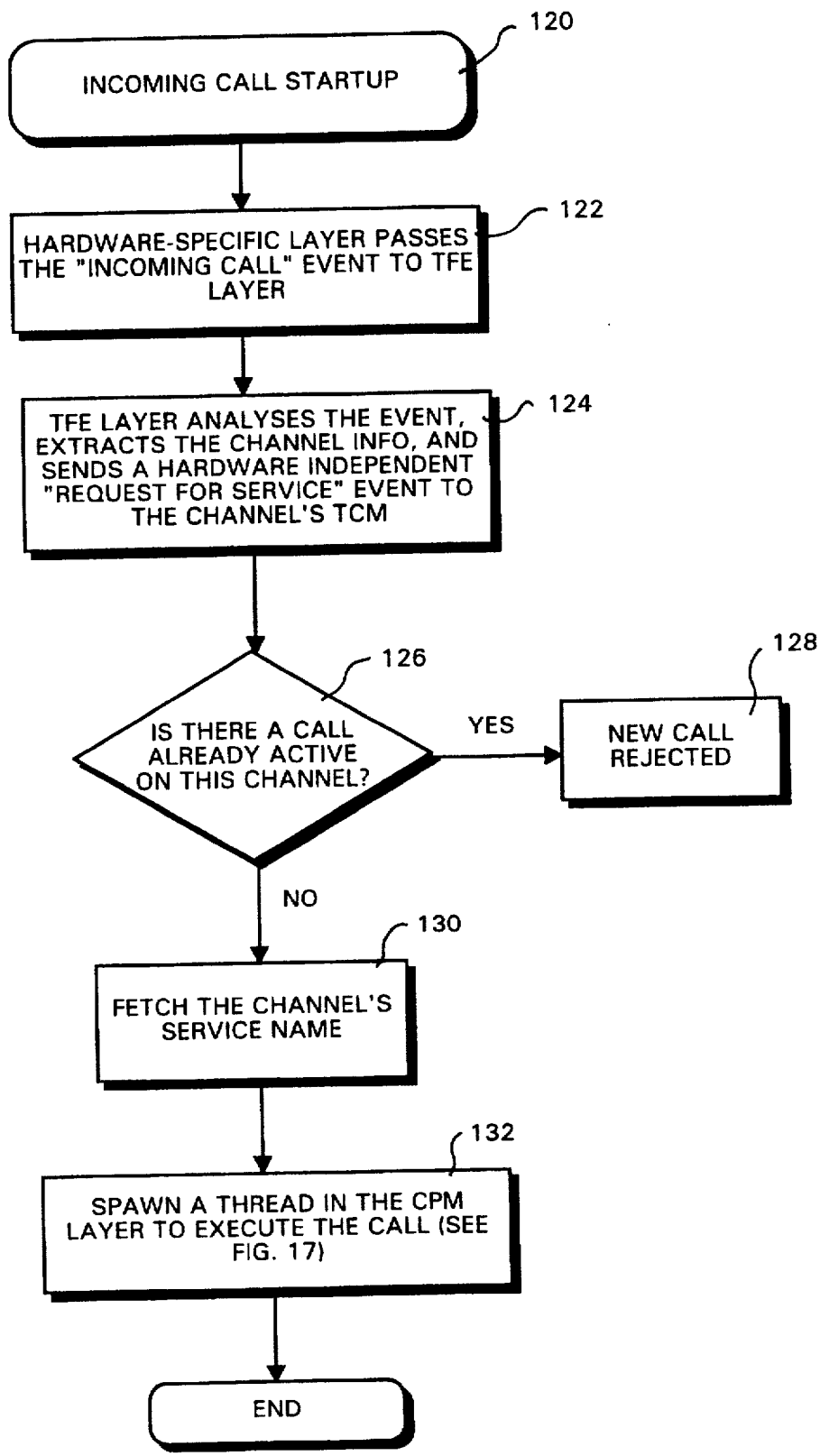
FIG. 6 is a software flow chart illustrating the procedure by which incoming calls are initiated and the appropriate call processing operations executed.

An incoming call startup procedure 120 will now be described in conjunction with the flow chart illustrated in FIG. 6. The hardware specific layer shown in FIG. 4(b) passes the "incoming call" event to the TFE layer (step 122). The TFE layer then analyzes the event, extracts the relevant channel information, and sends a hardware independent "request for service" event to the channel's corresponding TCM (step 124). In decision block 126, it is determined whether there is a call already active on this particular channel. If so, the new call is rejected in step 128; otherwise, the channel's service name, i.e. the service to be performed on this channel's information, is fetched in step 130. Then as will be described later in conjunction with FIG. 14, a thread is spawned in the CPM layer to execute the incoming call event (step 132).

With this overview of the call processing stack and its operation, a more detailed description of each layer from the bottom up is provided. The Telephony Front End (TFE) Layer 39 compensates for the fact that the TFE operations required in the messaging system cannot be all executed by one single piece of telephony equipment. Moreover, the TFE allows substitution/replacement of existing telephony hardware and software while minimizing engineering impact on the upper TCM 38 and CPM 37 layers. Being database driven, the TFE layer 39 the TCM and CPM layers do not need to know the details of the TFE layer configuration.

Different telephony operations in the TFE layer 39 are physically implemented by the TFE controllers (40a ... 40n). Each TFE controller 40 executes a subset of the entire collection of TFE functions examples of which are shown in FIG. 4(b). Each TFE controller 40 has one or more ports, and each port is associated with a telephony channel. A channel connects one port from one controller to a telephone a line in a communications network 22. Therefore, if the messaging system is required to issue an interruptible voice prompt to a caller on a specific outgoing telephone channel, it will first issue a command to the telephone circuit switch 24 via TFE function to read DTMF digits on a TFE port corresponding to the incoming channel from network 22, then another command to the telephone circuit switch 24 to connect the incoming channel to an internal channel 5', and then issue a voice out command to the signal processor 26 to output the voice prompt on the corresponding port.

Figure 7:
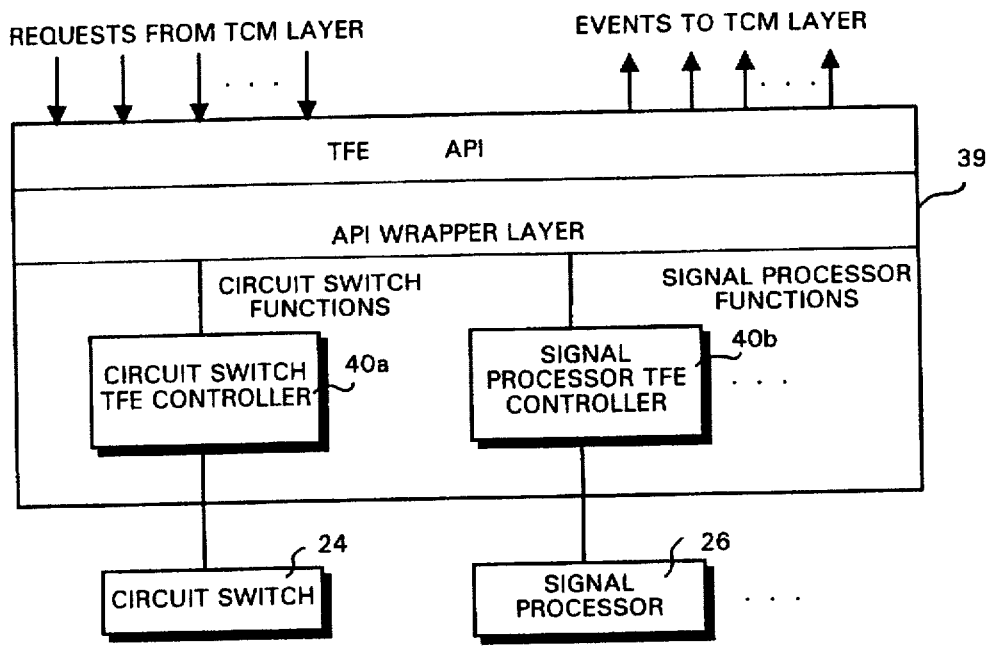
FIG. 7 is a diagram illustrating symbolically the software architecture of the TFE layer 39.

The decision process, however, does not occur within the TFE layer 39. The TFE layer 39 is used by the TCM layer 38 to perform discrete TFE functions (e.g. release, answer, voice out, read digit, etc.) on TFE channels and/or a TFE controllers, while hiding from the TCM layer 38 the details of how those TFE functions are implemented, e.g. identifying and routing to the appropriate TFE controllers 40. Referring to FIG. 7, the TFE layer 39 receives from the TCM layer requests and sends to the TCM layer returned events. As illustrated in FIG. 7, the TFE layer 39 can be viewed as a fence between the "upper" formal application programming interface (API) and a "lower level" API for adding/integrating TFE software controllers 40. The TFE controllers 40 and their channel assignments are stored in a database (not shown) that includes all the necessary parameters for the hardware channels and the hardware controllers, including actual TFE operations performed on each channel.

As described above, the TCM layer 38 in the call processing stack is responsible for the management of individual telephony channels. The TCM layer 38 is implemented using the well known threading paradigm where each configured and active telephony channel (I–N) corresponds to a TCM thread running on behalf of the channel. The TCM thread receives indications and responses from the TFE layer 39 and the TCM layer 38 receives requests (threads) from CPM layer 37.

TCM layer 38 provides a well-defined, channel-oriented interface between the hardware oriented TFE layer 39 and the high level, operationally-focussed CPM layer 37. Telephony channels are grouped into generic classes that define their behavior. The entire state of the channel is governed by the TCM layer. Specifically, TCM threads are activated (spawned) for each configured telephony channel at system initialization time and continue to live until the system shuts down.

When a TCM thread is activated and opened, it "binds" to the TFE layer 39. By binding to the TFE layer, the TCM registers itself as a valid entity which can use the services of the TFE layer. This binding signifies that the TCM thread can receive unsolicited events from the TFE layer 39. In addition, binding allows the TCM layer 38 to invoke TFE functions to allow interaction with the TFE controllers 40. Messages received by TCM layer 38 from CPM layer 37 are passed to TFE layer 39 via procedure calls to TFE functions. As described above, the TFE functions routes the request to the appropriate TFE controller 40. Unsolicited events are passed from the TFE layer 39 to the appropriate TCM 38 by invoking a "callback" procedure stored in the TFE controller data structure as part of the binding process. This callback procedure posts corresponding events and data to the TCM thread.

The CPM layer 37 operates on the concept of a logical participant in the call referenced to as a "party", as opposed to operating simply on telephony channels. For example, the CPM layer 37 prompts a caller independently of how many TCM channels might be involved in this operation. Therefore, the caller is a party in the call, and telephony operations in the CPM layer relate to parties. Every call has one or more parties. Each party can be assigned a logical name in the context of the service (e.g. "operator", "caller", "CALLER_A", "subscriber", "tape player", etc). At any given moment during the progress of the call, there is always a selected party, i.e. a party which is the object of the currently executed telephony operation(s). For instance, when the CPP which plays a voice prompt is executed, the currently selected party will hear the prompt. A CPP selects the current party. If there are two parties in a call, and the service reaches a state in which the system must hang-up on both parties, these CPPs must be called in the following order:

1) select_party(PARTY_A)
2) hang_up()
3) select_party(PARTY_B)
4) hang_up( )

Figure 8:
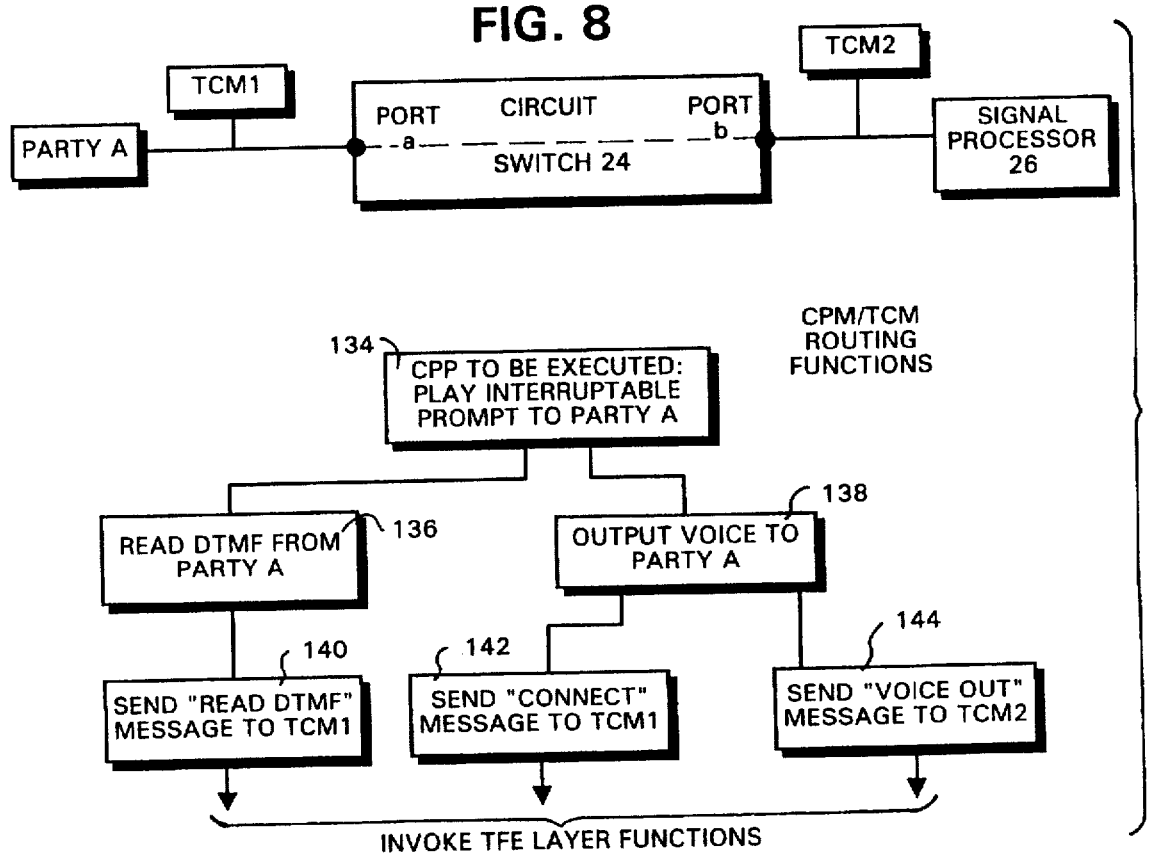
FIG. 8 illustrates symbolically in block diagram and flow chart form how a call processing primitive (CPP) is decomposed and executed using the call processing stack.

FIG. 8 is a high level diagram that illustrates how a CPP "Play interruptable prompt to party A" is handled by the call processing stack. Here party A is connected by circuit switch 24 at port a. The CPM layer 37 decomposes a CPP call operation into one or more messages to one or more TCM's with the ultimate goal being to divide the call operation into one or more discrete TFE operation(s) that can be executed by the appropriate TFE controllers. For example, although "hanging-up" is a single TFE operation, playing an interruptible prompt to party A involves two TFE operations on the same party A: (1) outputting voice and (2) reading a DTMF digit. This breakdown is performed within the body (i.e. lines of code that implement a CPP) of the CPP from where two function calls are made to send appropriate TFE commands (steps 3, 4).

As shown in the simplified hardware portion of FIG. 8, party A is connected to port a of circuit switch 24. The CPM layer maintains a list of TCM threads associated with each caller. At the initiation of the call by party A, only one TCM1 is associated to party A which connects the call from the PSTN to the circuit switch 24 at port a. The CPM layer breaks the call processing primitive "play interruptible prompt to party A" into two different tasks paths (step 134). The first CPP task is to read any DTMF tones generated by party A depressing touchtone key pads on A's telephone handset (step 136). But before this step can be implemented, the TCM layer must determine if the specific thread TCM1 has the capability of listening for DTMF tones. As shown in the hardware block diagram portion of FIG. 8, since TCM1 is associated with the connection between party A and circuit switch 24, TCM1 can perform this function. Accordingly, the TCM layer sends a brief DTMF message to thread TCM1 in block 140. TCM1 then executes this function by calling the TFE function which invokes the necessary operations in the TFE layer.

The other task which must be performed for this call processing primitive is that of outputting voice to party A as indicated in block 138. Again the TCM layer determines whether the current thread TCM1 can perform this task. In this case, TCM1 is not currently connected to anything that can output voice. Accordingly, TCM2 is identified to perform this task since it connects signal processor 26 to circuit switch 24 via port b. Since TCM2 is now associated with party A, the CPM layer adds both TCM1 and TCM2 to that party's list. The TCM layer then generates a TFE function command (step 142) to connect TCM1 and TCM 2 in the circuit switch indicated as a dashed line. In addition, the TCM layer sends a "voice out" message to TCM2 in step 144 which then executes the appropriate TFE operations in the TFE layer to perform this task.

The CPM layer monitors events originating from one of the call's parties (e.g. a touch tone digit pressed) using a procedure call that enters those events in a lightweight inter-thread mailbox. Part of associating a TCM to a party includes recording the address of such a mailbox to post events received from the TFE layer. Therefore, when a TFE event is received by any TCM associated to a certain party, the event is returned to the CPM via the inter-thread mailbox.

Figure 9:
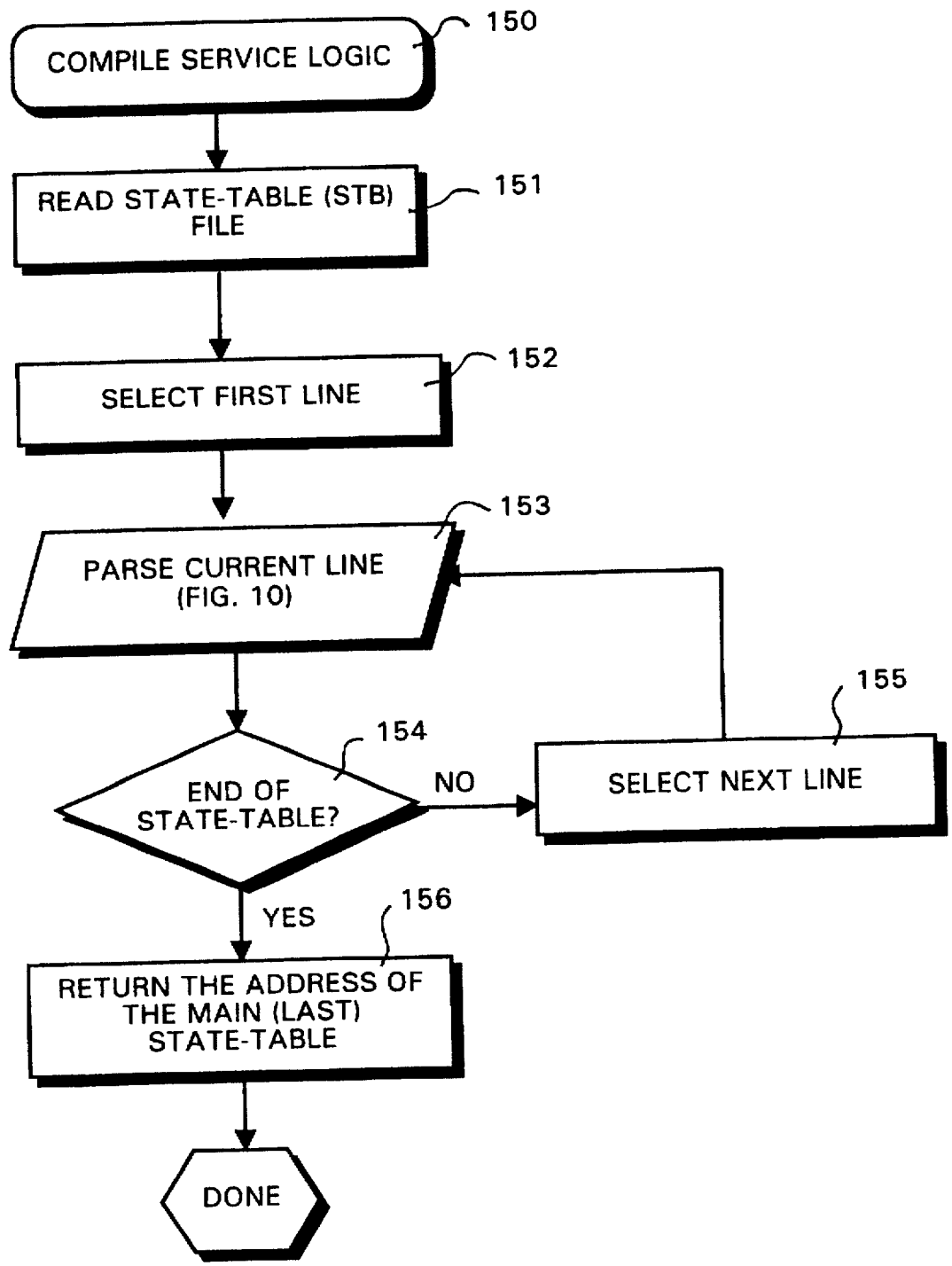
FIG. 9 is a software flow chart illustrating the general procedures followed in compiling service logic.

The following is a description of various operational aspects of the present invention with reference to the software flow charts illustrated in FIGS. 9–20. FIG. 9 is a software flow chart describing the general operation for compiling service logic in accordance with the present invention (step 150). The state table (STB) file for the particular call processing service being handled is read in step 151. The first line in the state table is selected in step 152, and the current line is parsed in step 153. Additional description of this parsing operation is provided in conjunction with subsequent figures. A decision is made in step 154 whether the end of the state table has been reached. If it has not, the next line is selected in step 155 and parsed in step 153. If the state table has been fully compiled, control proceeds to block 156 where the address of that compiled state table is returned to the service initialization routine.

Figure 10:
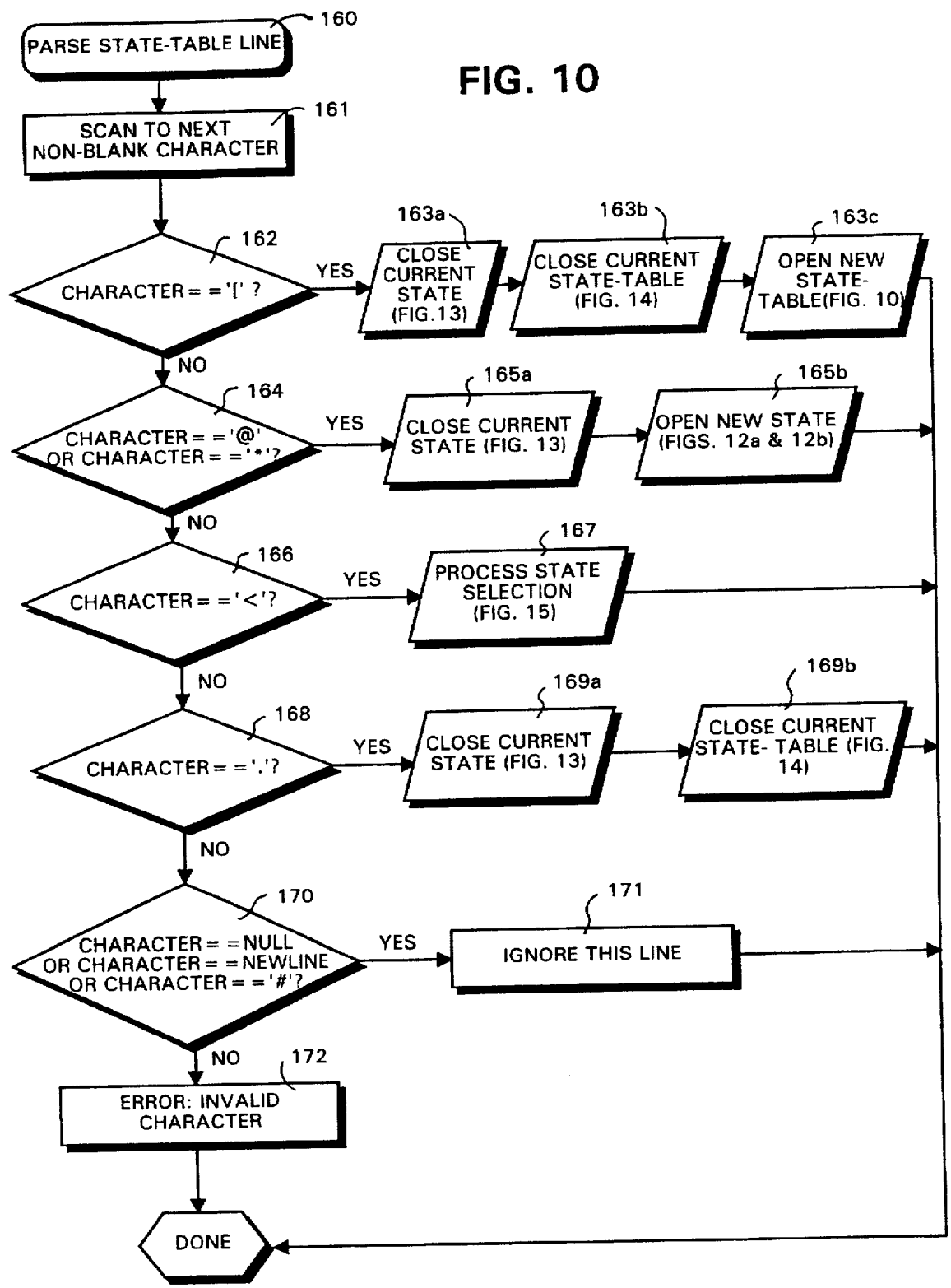
FIGS. 10–16 are software flow charts which illustrate various specific parsing and compiling operations for the service logic.

The parsing of a state table line is now described in more detail in the flow chart of FIG. 10 beginning at block 160. In block 161, the next nonblank character in the state table line is scanned. The character is checked in decision block 162 to determine if it is a "[". If it is, the current "state" is closed in step 163a, the current "state table" is closed to step 163b, and a new state table is opened in step 163c. Otherwise, control proceeds to decision block 164 where determination is made whether or not the character is a "@" or "*". If it is, the current state is closed in step 165a, and a new step is opened in step 165b. Otherwise, control proceeds to decision block 166 where a determination is made whether the character is a "<". If it is, the selected state is processed in step 167; otherwise, control proceeds to decision block 168 where a determination is made whether the character is a ".". If it is, the current state is closed in step 169a, and the current state table is closed in 169b. Otherwise, control proceeds to decision block 170 to determine whether the character is a null line, a new line, or a "#" symbol. If it is, this line is ignored in accordance with step 171; otherwise, the character is identified as invalid character in step 172.

Figure 11:
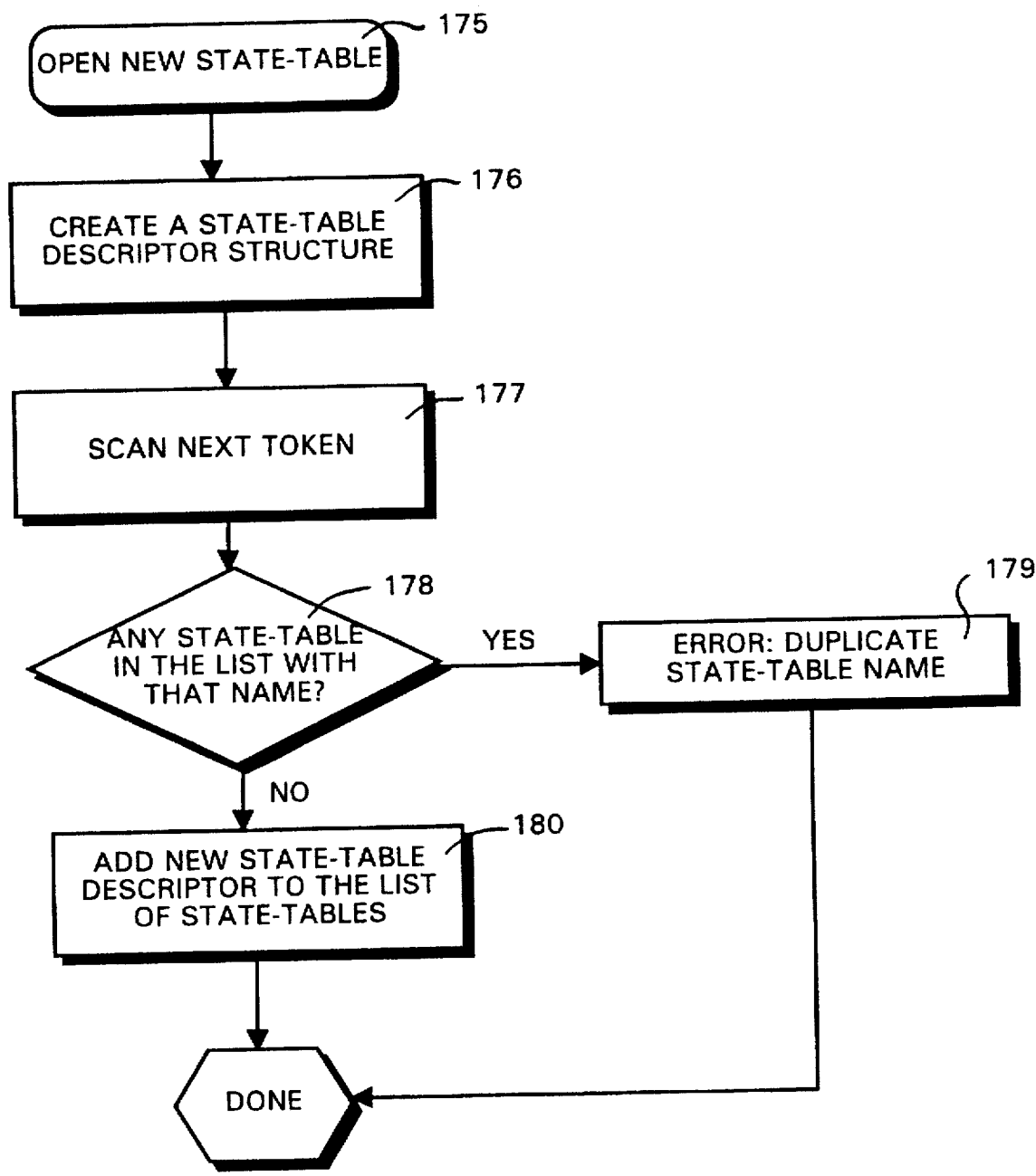

The open new state table operation referred to in FIG. 10 is described in more detail in FIG. 11 beginning with block 175. In step 176, a state table descriptor structure is created. Then in step 177, the next token is scanned and a determination is made in step 178 whether any state table in the list of already defined state tables exists with that name. If so, a duplicate name has been chosen and an error is generated in step 179. Otherwise, a new state table descriptor is added to the list of state tables in step 180.

Figure 12A:
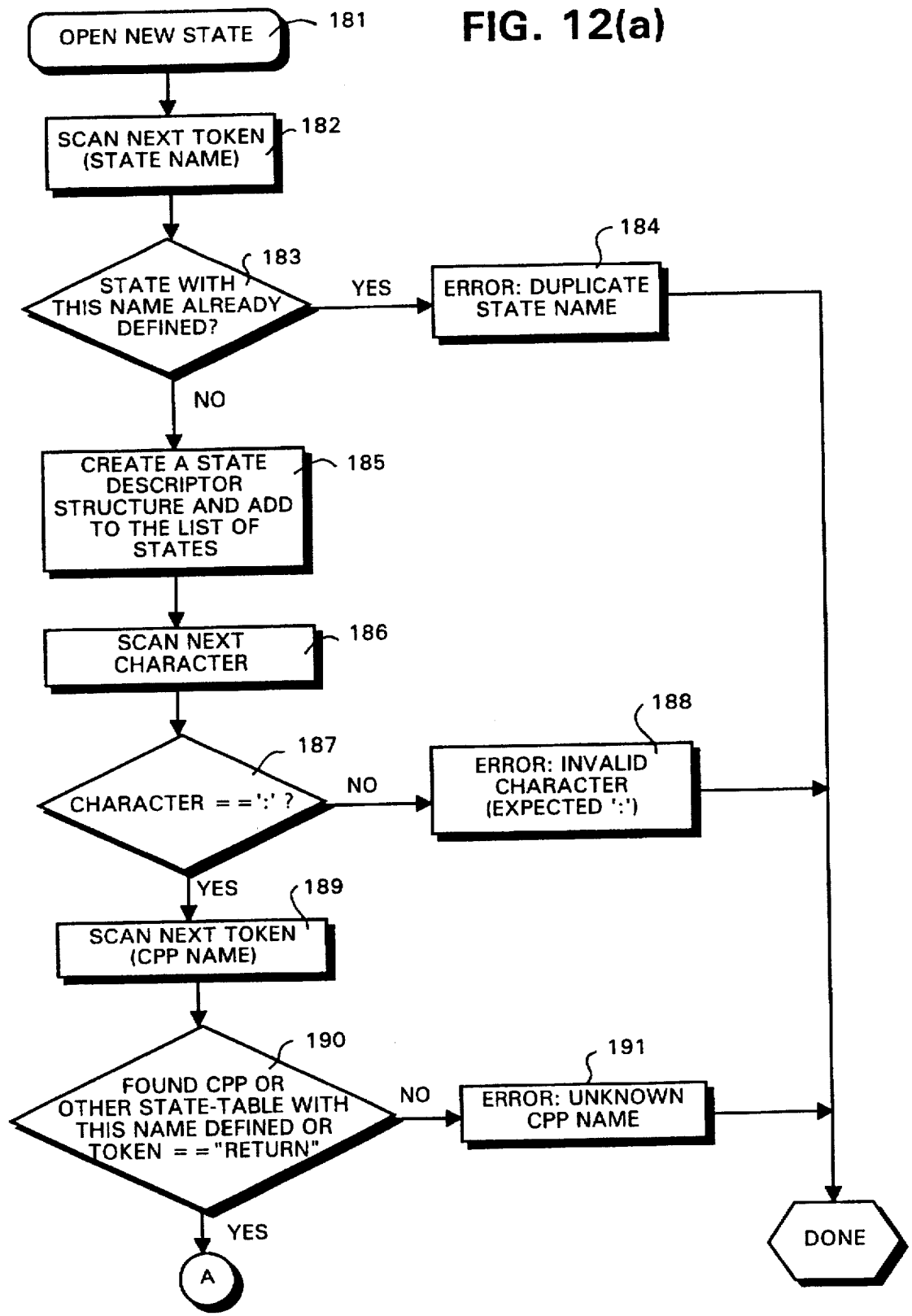
Figure 12B:
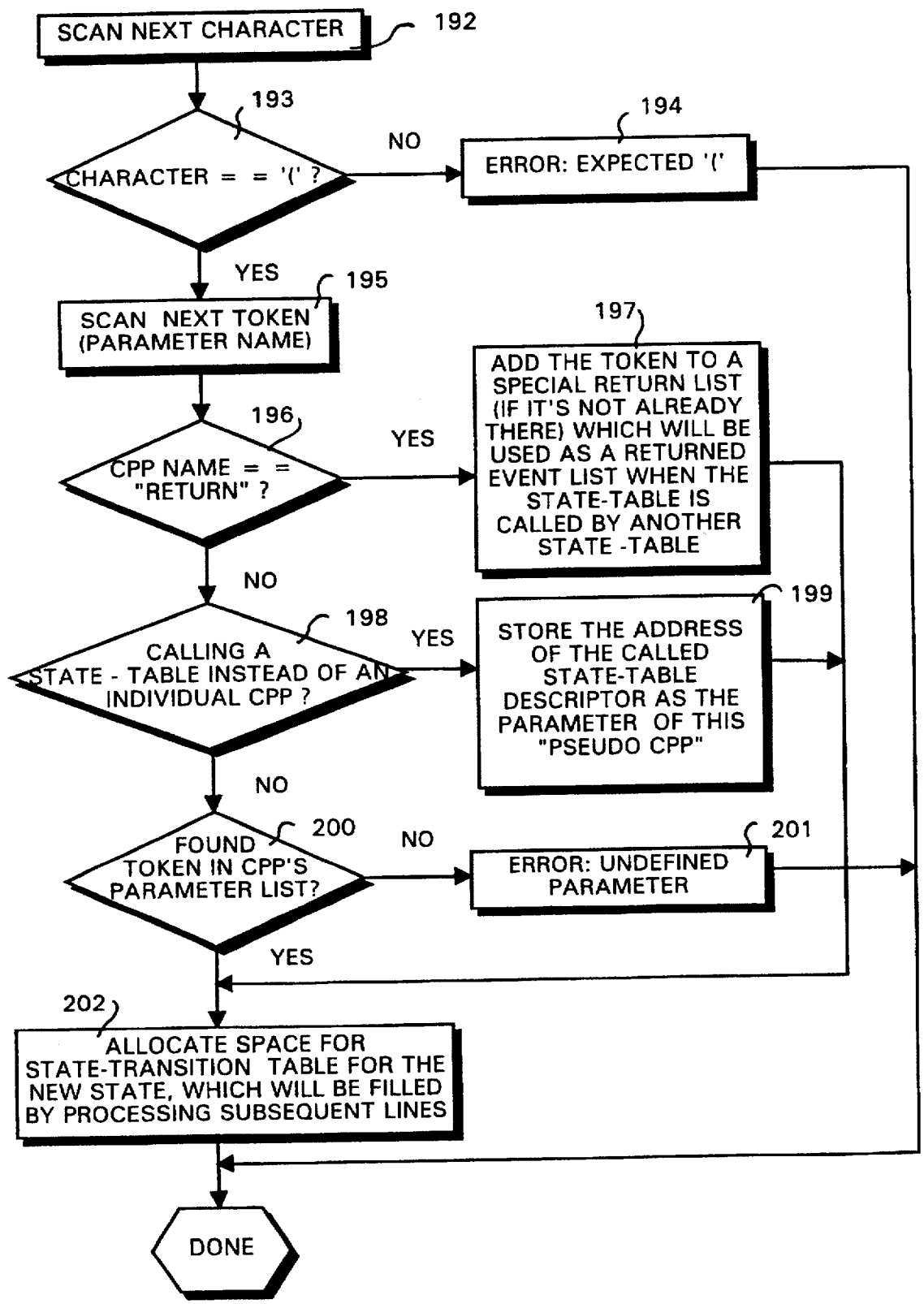

FIGS. 12(a) and 12(b) describe the procedures followed for opening a new state starting at block 181. The next token (here a state name) is scanned in block 182, and a decision is made in block 183 whether a state with this name has already been defined. If so, an error is generated step 184; otherwise, a state descriptor structure is created and added to the list of states in block 185. The next character is scanned in 186, and a decision is made in block 187 whether the character is a ":". If not, the character is indicated as invalid in step 188; otherwise, the next token is scanned (in this case a CPP name) in step 189. In step 190, a decision is made whether a CPP name is found, whether another state table with this name exists, or whether the scanned token is a "return" token. If none of these conditions exist, the CPP is an unknown name, and an error is generated in step 191. Otherwise, control proceeds onto step 192 in FIG. 12(b) to scan the next character. A decision is made in step 193 whether the character is a "(". If not, an error is generated in step 194; otherwise, the next token (in this case the parameter name) is scanned in step 195. Inquiry is made in block 196 whether the CPP name is "returned". If so, the parameter name token is added to a special return list (if it is not already present on the list) used as a returned event list when the state table is called by another state table (step 197). Otherwise, control proceeds to decision step 198 to determine if a state table is being called as a "pseudo CPP" instead of an individual CPP. If so, the address of the called state table descriptor is stored as the parameter of this "pseudo CPP" in step 199, and thereafter, control proceeds to step 202. Otherwise, control proceeds to decision step 200 to determine if the token is located in the CPP's parameter list. If not, the parameter is undefined and an error is issued in step 201; otherwise, space is allocated in the state transition table for the new space, that space will be filled by processing subsequent lines (step 202).

Figure 13:
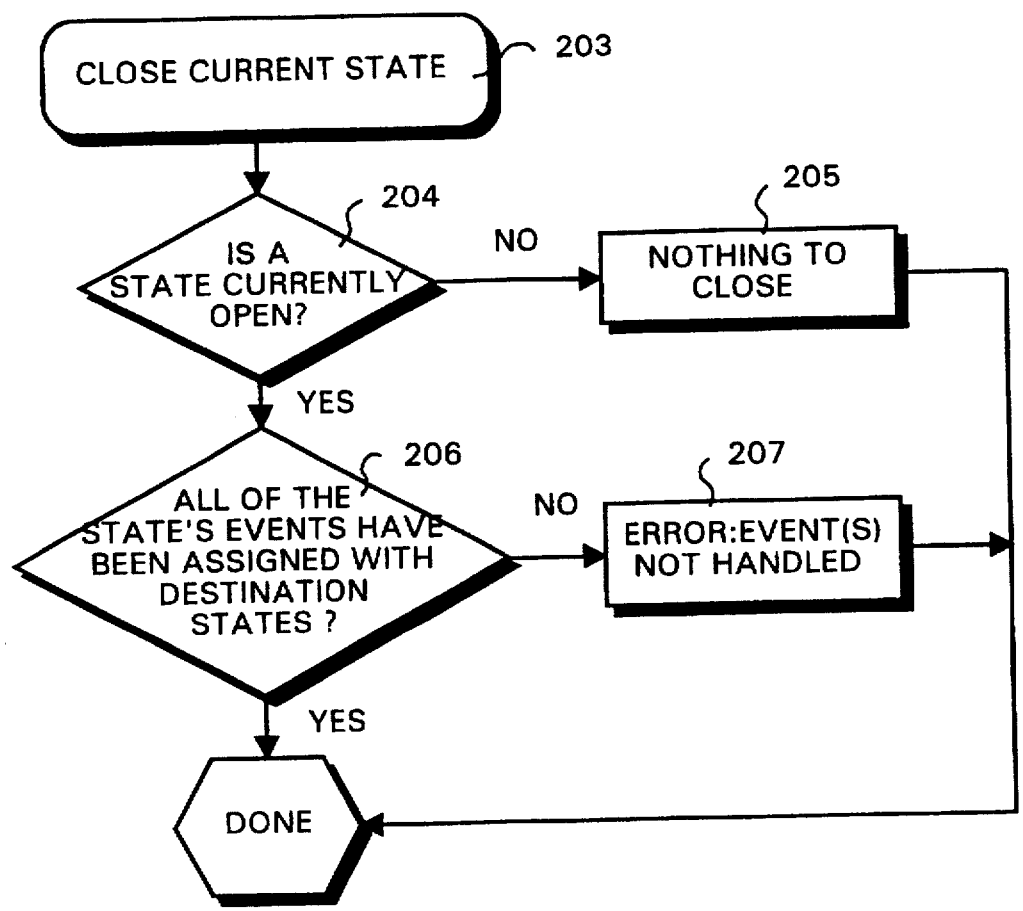

The closing of a current state is described in FIG. 13 beginning at block 203. A decision is made in step 204 if a state is currently opened. If not, there is no state to close as indicated in step 205. Otherwise, a decision is made in step 206 whether all of the open state's events have been assigned with destination states. If not, an error is issued in block 207. If all the open state's events have been assigned with destination states, then the current state is closed.

Figure 14:
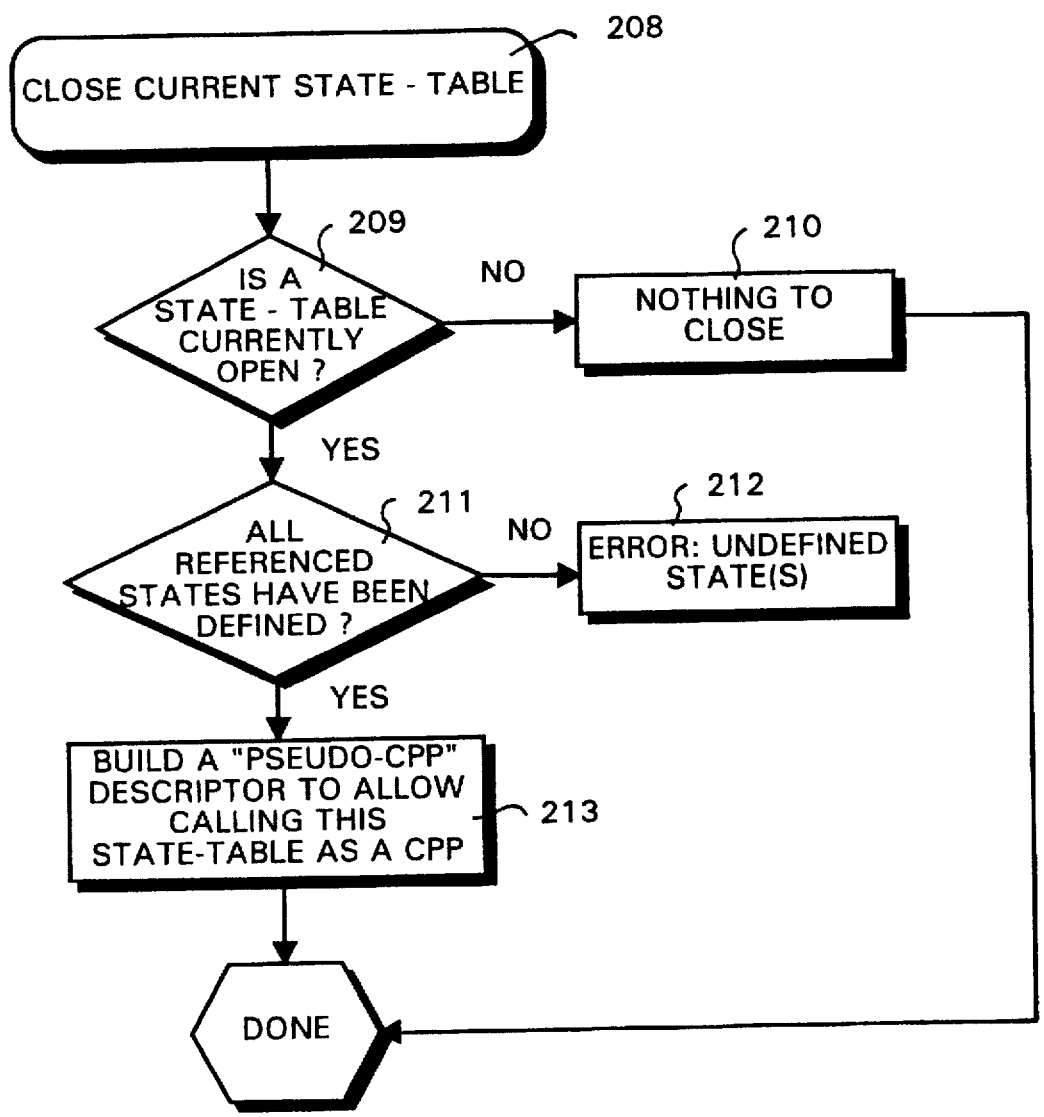

The closing of a current state table is described now in conjunction with FIG. 14 beginning at block 208. In decision step 209, a determination is made whether the state table is currently open. If not, there is nothing to close as indicated in step 210. Otherwise, a determination is made in step 211 whether all referenced states have been defined. If not, an error is issued indicating that the states are undefined in step 212; otherwise, a pseudo CPP descriptor is constructed to permit this state table to be called as a CPP in step 213.

Figure 15:
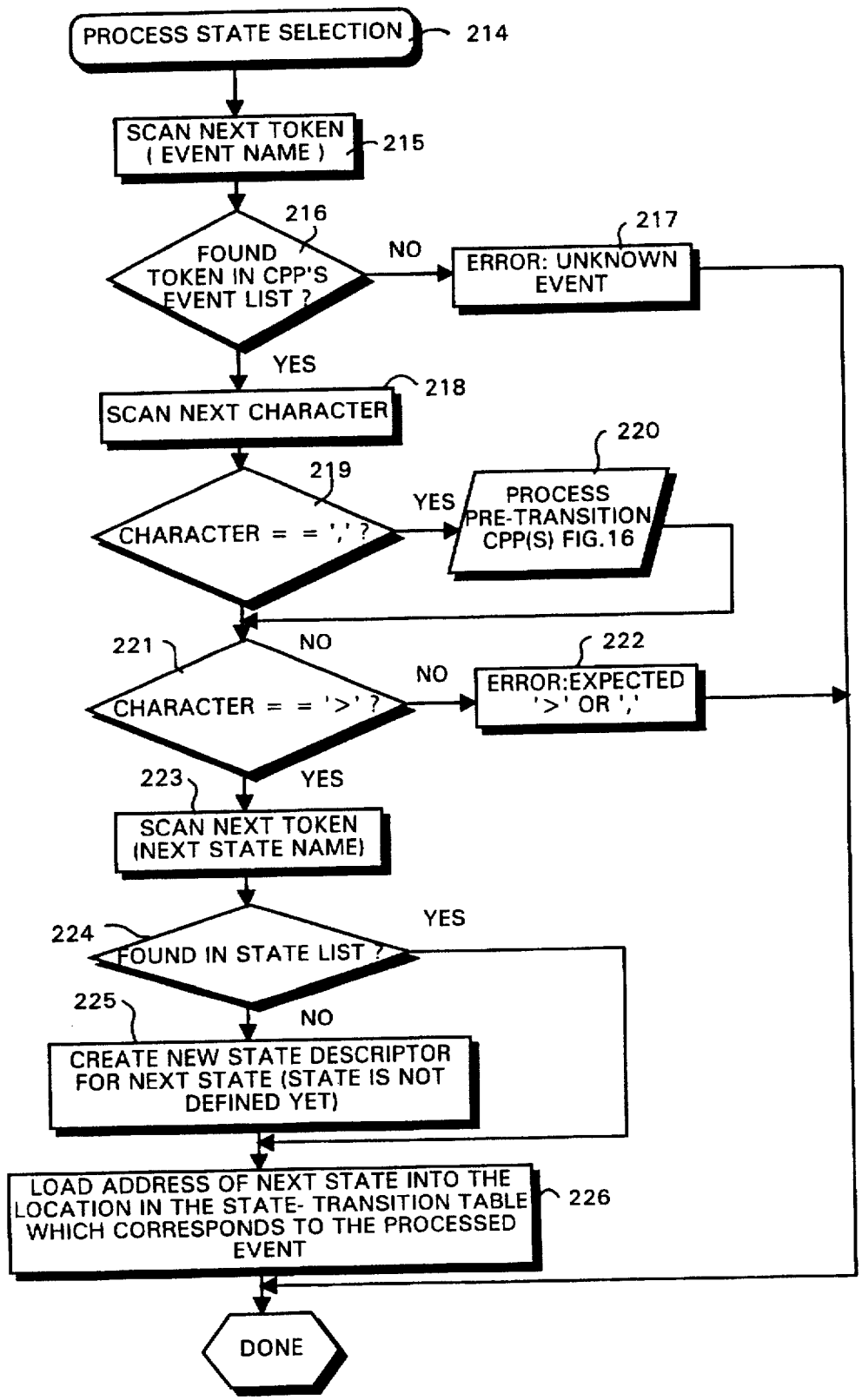

The state table state selection process is now described in conjunction with FIG. 15 beginning at block 214. In step 215, the next token corresponding in this case to an event name is scanned. Control proceeds to decision step 216 to determine whether the scanned token is located in the CPP's event list (block 216). If not, an error is issued for an unknown event in block 217. If the token is found, the next character is scanned in block 218, and a decision is made in step 219 lo whether the character is a ".". If it is, pretransition CPPs (i.e., CPP(s) that may be executed before transition to a new state after an event leading to the new state has been returned by the state's CPP) are processed as indicated generally in block 220. Otherwise, control proceeds to decision block 221 to determine whether the character is a ">". If not, an error is issued in step 222; otherwise, control proceeds to block 223 where the next token corresponding to the next state name is scanned. A determination is made in step 224 whether that state name is located in the state list. If it is, control proceeds to step 226 described below; otherwise, a new state descriptor is created for the next state in step 225. The address of the next state is then loaded into the location in the state transition table which corresponds to the process event in step 226.

Figure 16:
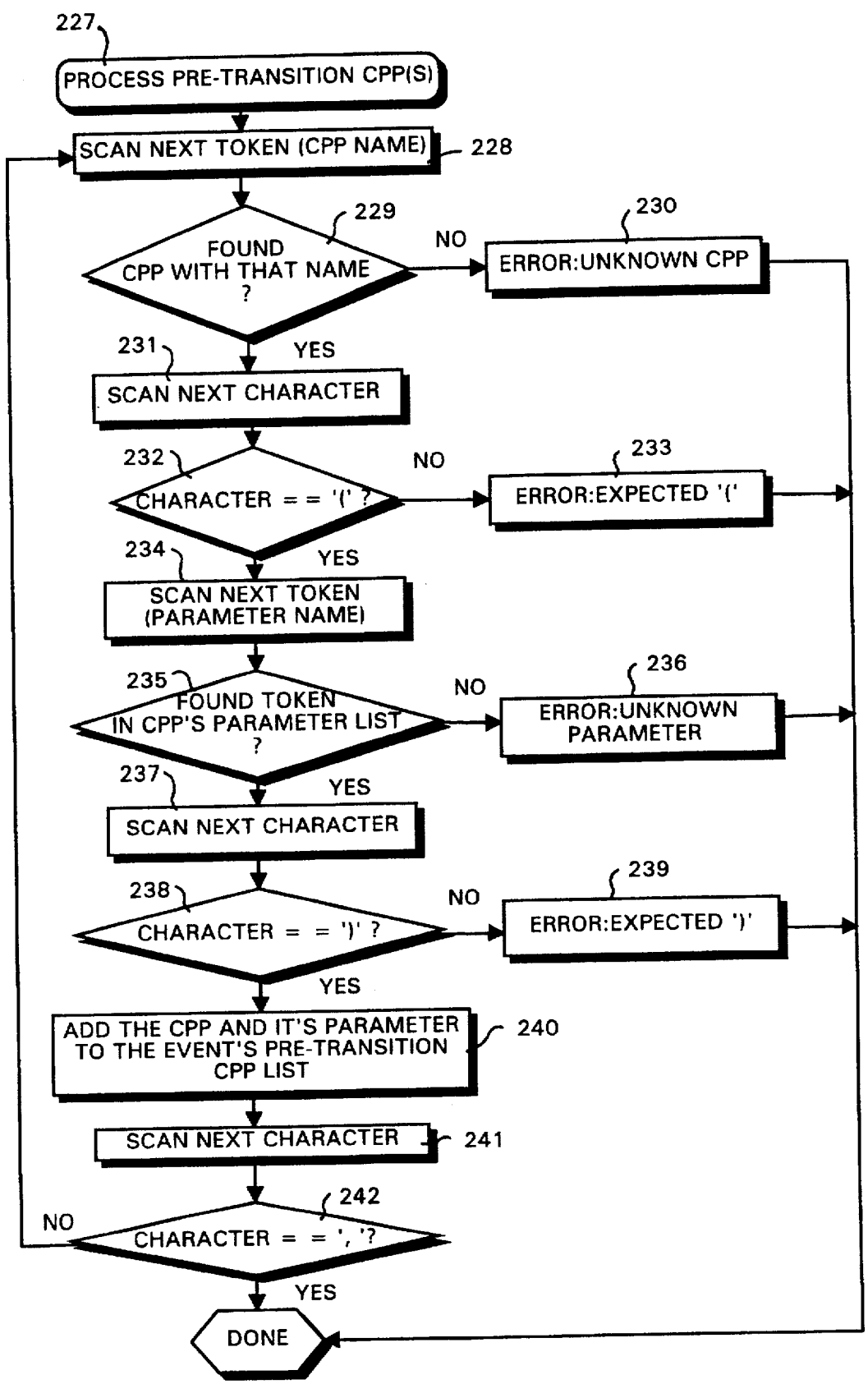
Figure 17:
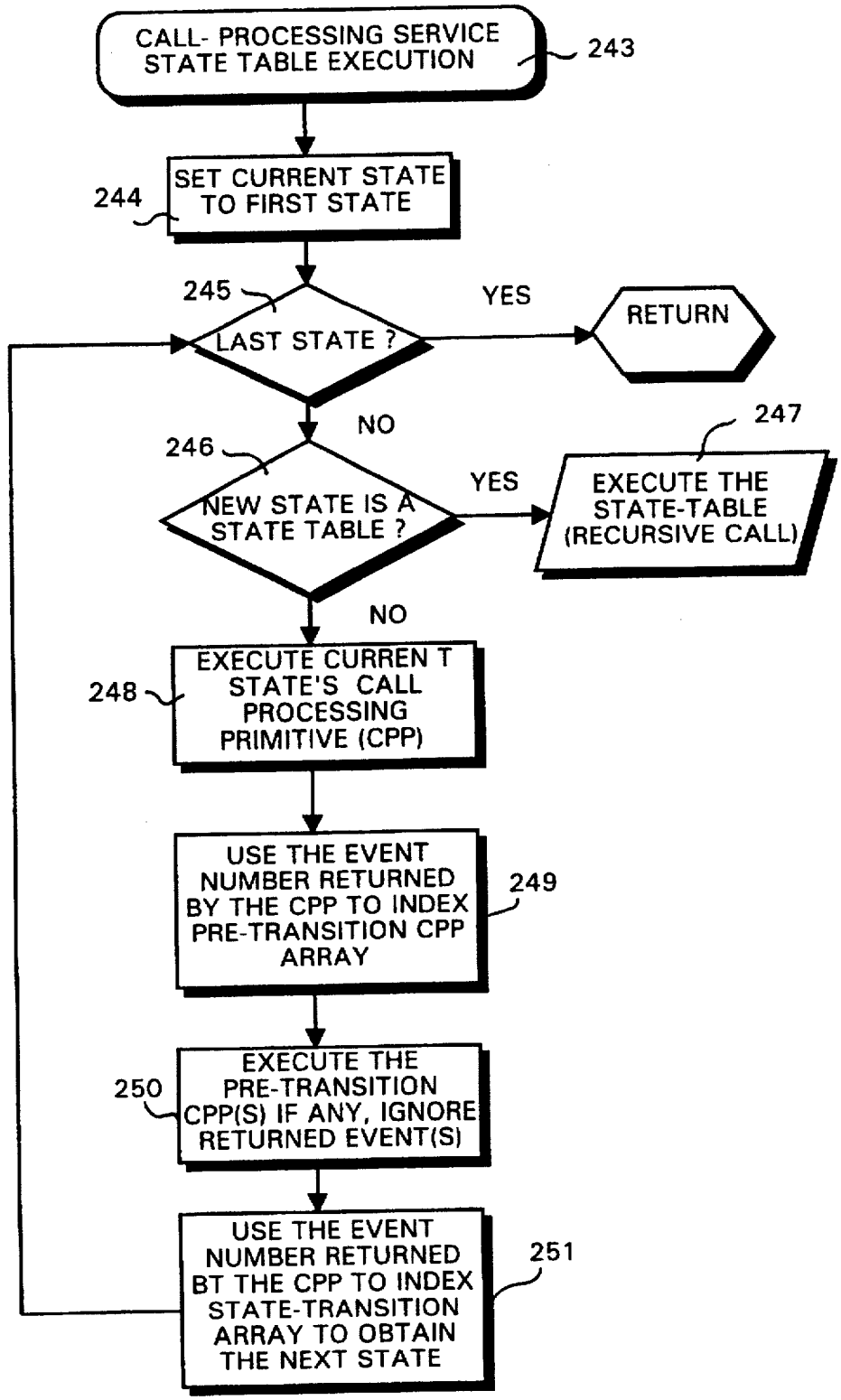
FIG. 17 is a software flow chart illustrating execution of a call processing service state table.

The processing of pretransition CPPs referred to in step 220 above is now described in conjunction with FIG. 16 beginning at block 227. The next token corresponding to a CPP name is scanned in block 228. If no CPP is found with that name (step 229), an error corresponding to an unknown CPP is generated in step 230. If the CPP is found, the next character is scanned in step 231 and a decision is made in step 232 whether the character is a "(". If not, an error is generated in step 233; otherwise, the next token corresponding to a parameter name is scanned in block 234. If the scanned token is not found in the CPP parameter list, an unknown parameter error message is generated in block 236; otherwise, the next character is scanned in block 237 and a decision is made whether the character is a ")" in step 238. If not, an error message is generated in step 239; otherwise, the CPP in its parameter is added to the events pretransition CPP list in step 240. The next character is scanned in step 241 and a decision is made whether that character corresponds to a ".". If so, pretransition CPP processing is completed; otherwise, control proceeds back to step 228.

A description of a call processing service state table execution is now provided in conjunction with FIG. 14 beginning at block 243. The current state is set to a first state in the state table that is executed at the onset of a call in block 244. A determination is made in step 245 whether the current state corresponds to the last state. If so, this routine is finished; otherwise control proceeds to decision step 246 to determine whether the new state is a state table. If it is, the state table execution is recursively called in step 247. An important capability of the messaging system is service switching within a call, i.e. a service's state table returns events which cause the system to execute a different service. The new service's compiled state-table is then executed from its first state until it returns. If the new state is not a state table, the current state's call processing primitive is executed in step 248. The event number returned by the executed CPP is used to index a pretransition CPP array or table of lists of pretransition CPPs, one list for each possible event as described in FIGS. 12 and 13. The pretransition CPP(s) (if any) are executed in step 250 with returned events ignored. In step 251, the return event number is used by the CPP to index to the next state. Control then proceeds back to decision block 245.

Figure 18:
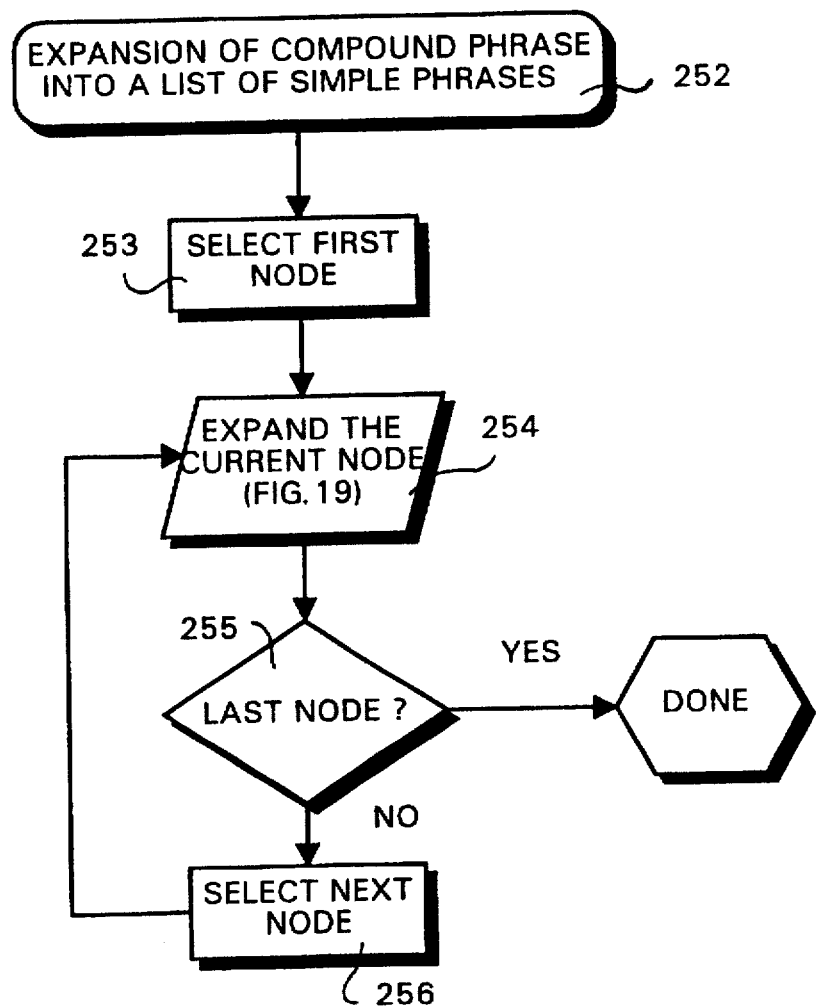
FIG. 18 is a flow chart describing expansion of a compound phrase into a list of simple phrases.
Figure 19:
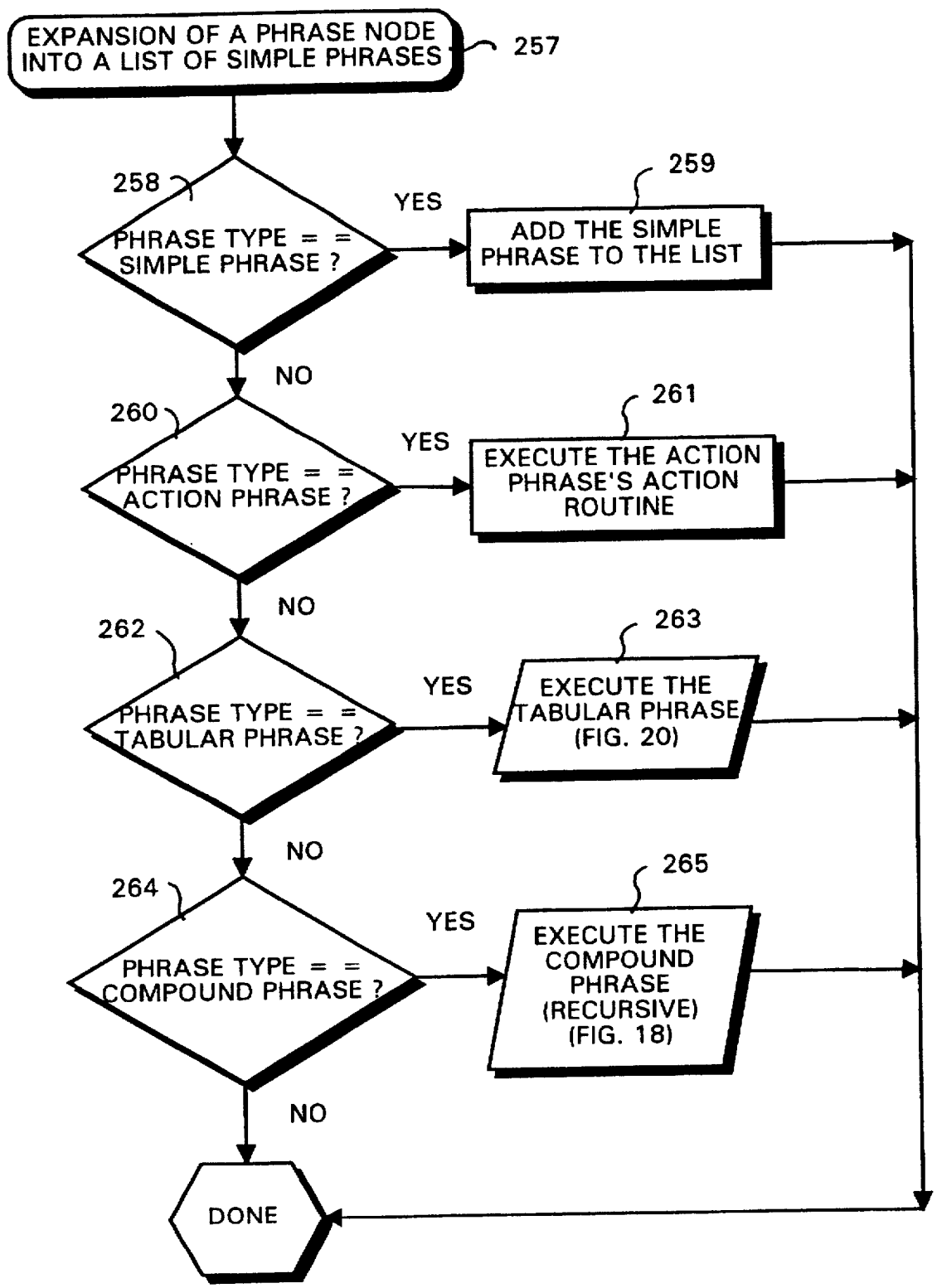
FIG. 19 is a software flow chart describing expansion of a phrase node into a list of simple phrases.
Figure 20:
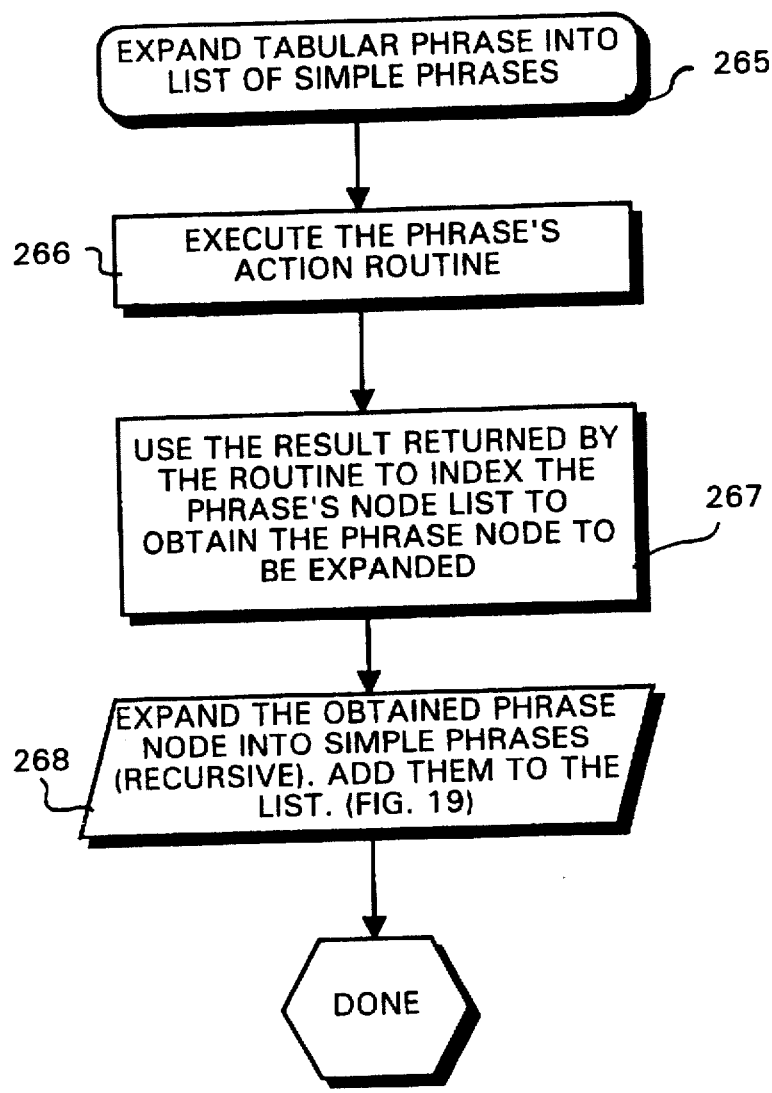
FIG. 20 is a software flow chart describing expansion of a tabular phrase into a list of simple phrases.

A description is now provided of various phrase expansion processes in conjunction with the flow charts in FIGS. 18–20. By way of background, a compound phrase is a list of one or more phrase nodes. A phrase node points to a phrase which can be of any one of the following types: simple phrase, action phrase, tabular phrase, or another compound phrase. A compound phrase is recursively expanded into a list of simple phrases following the same procedure. An action phrase represents a simple routine to be executed and does not expand to any phrases. A tabular phrase also represents a routine to be executed, but it includes a table which gets indexed at run time by the result returned by the routine select a phrase node which gets recursively expanded into a list of simple phrases. When this recursive process is completed, a list of simple phrases is obtained, each simple phrase representing a segment of recorded sound.

The flow chart in FIG. 18 shows expansion of a compound phrase into a list of simple phrases beginning at block 252. A first phrase node is selected in step 253. The current phrase node is expanded in step 254 as will be described more specifically in conjunction with FIG. 19. The decision is made whether this is the last phrase node in step 255. If so, this routine is completed. Otherwise, the next node is selected in step 256 and control returns to the node expansion step 254.

FIG. 19 illustrates a flow chart describing expansion of a simple phrase node into a list of simple phrases beginning at block 257. A determination is made whether the phrase type corresponds to a simple phrase in step 258. If so, the simple phrase is added to the simple phrase list in step 259; otherwise, a determination is made whether the phrase is an action phrase in step 260. If so, the action phrase's action routine is executed in step 261; otherwise, a decision is made in step 262 whether the phrase type is a tabular phrase. If so, the tabular phrase is executed in block 263 which is described in more detail in FIG. 20. If the phrase is not a tabular phrase, then control proceeds to decision step 264 to determine whether the phrase corresponds to a compound phrase. If not, this routine is completed; otherwise, the compound phrase is recursively executed in accordance with the flow chart illustrated in FIG. 18 described above.

FIG. 20 describes the expansion of a tabular phrase into a list of simple phrases beginning at node 265. The phrase's action routine is executed in step 266. The result returned by the phrase's action routine is used to index the phrase's node list to obtain the phrase node to be expanded in step 267. The obtained phrase node is expanded into simple phrases in conjunction with the procedures illustrated in FIG. 19 and added to the simple phrase list in step 268.

While the invention has been particularly shown and described is with reference to a preferred embodiment thereof, it will be understood by those skilled in the art that various alterations in form and detail may be made without departing from the spirit and scope of the invention. For example, the present invention has been described in various examples in a telephony environment. The present invention may also be applied to any other multi-media communications environment as well.

What is claimed is:

1. A call processing method for processing subscriber communications in a message handling system to provide a variety of different communications services including messaging application services, comprising the steps of:

identifying a requested call processing messaging application service in response to a subscriber call;

establishing a set of call processing primitives to perform the requested call processing messaging application service, each primitive performing a single call processing operation;

setting up a service state table that establishes a sequence of logical states for providing the requested call processing messaging application service, each primitive being associated with a state in the service state table in which the primitive is included, and each primitive being associated with one of a variety of different objects or events;

executing the state table to provide the requested call processing messaging application service, wherein execution of each logical state invokes one call processing primitive; and modifying one or more of the different objects or events to modify the requested call processing messaging application service without modifying the call processing primitives in the one service state table.

2. The call processing method according to claim 1, wherein each call processing primitive includes a call processing name, a list of values the call processing primitive accepts as an argument, and a list of results produced when the call processing primitive is executed.

3. The call processing method according to claim 1, wherein each primitive is identified by selecting a display icon on a display and executed by a data processor automatically retrieving and executing computer programming language instructions that correspond to the call processing primitive.

4. The call processing method according to claim 1, further comprising:

dividing various ones of the call processing primitives into functional classes related to a call processing function.

5. The call processing method according to claim 4, wherein the call processing primitive functional classes include a telephony class and a messaging handling class.

6. The call processing method according to claim 1, wherein each primitive is a source of events.

7. The call processing method according to claim 1, wherein one or more pretransition call processing primitives are executed before transition to a next state.

8. The call processing method according to claim 1, wherein one or more other state tables is executed from a single state in the service state table.

9. The call processing method according to claim 1, wherein the modifying step includes modifying one or more of the objects or events associated with the call processing primitives in the one service state table.

10. The call processing method according to claim 1, wherein each of the call processing primitives operates on only a single argument.

11. The call processing method according to claim 1, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

12. The call processing method according to claim 1, wherein the messaging application services include a telephony channel service used to determine a subscriber identity associated with a subscriber making a call request for a messaging application service followed by a messaging service specifically subscribed to by the identified subscriber.

13. The call processing method according to claim 1, wherein the modifying step includes modifying one or more of the objects or events associated with the call processing primitives in the one service state table.

14. The call processing method according to claim 1, wherein each of the call processing primitives operates on only a single argument.

15. A call processing method for processing subscriber communications in a message handling system to provide a variety of different communications services including messaging application services, comprising:
    identifying requested call processing messaging application services in response to subscriber calls;
    dividing each requested call processing messaging application service into a sequence of call processing primitives to perform the call processing messaging application service, each primitive performing a single call processing operation;
    defining features of the call processing messaging application services using a group of parameters associated with the call processing messaging application services including (1) one or more global service parameters which correspond to one or more communications services but are independent of a specific subscriber and (2) subscriber specific parameters; and
    executing sequences of call processing primitives using the group of parameters including the one global service parameter and subscriber specific parameters to provide requested call processing messaging application services.

16. The call processing method according to claim 15, wherein various ones of the call processing primitives are allocated in function classes related to a call processing function including a telephony class and a message handling class.

17. The call processing method according to claim 15, wherein the group of parameters includes call processing variables.

18. The call processing method according to claim 17, wherein the group of parameters includes one or more objects for storing or accessing a message in the message handling system.

19. The call processing method according to claim 15, wherein the group of parameters includes one or more sets of voice prompts for the call processing messaging application service, each voice prompt being actuable by executing a corresponding call processing primitive.

20. The call processing method according to claim 19, wherein each voice prompt is defined as a combination of phrases.

21. The call processing method according to claim 20, wherein the phrases include speech phrases, silence phrases, or tone phrases stored in phrase tables.

22. The call processing method according to claim 19, wherein the voice prompts include prompts in different languages.

23. The call processing method according to claim 15, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

24. The call processing method according to claim 15, wherein the messaging application services include a telephony channel service used to determine a subscriber identity associated with a subscriber making a call request for a messaging application service followed by a messaging service specifically subscribed to by the identified subscriber.

25. A call processing method for processing subscriber communications in a message handling system to provide a variety of different communications services including messaging application services comprising the steps of:
    identifying a requested call processing messaging application service in response to a subscriber call;
    establishing a set of call processing primitives as call processing service development tools to perform the requested call processing messaging application service, each call processing primitive performing a single call processing operation independent of other call processing primitives in the set of call processing primitives involved in performing the requested call processing messaging application service;
    creating a corresponding call processing messaging application service record including data structures defining the requested call processing messaging application service that are used by the set of call processing primitives; and
    providing the requested call processing messaging application service using the set of call processing primitives and the data structures from the call processing service record.

26. The call processing method according to claim 25, wherein the data structures include one or more state tables that establish a sequence of logical states for providing the requested call processing messaging application service.

27. The call processing method according to claim 26, wherein the providing step includes executing the one or more state tables, execution of each logical state invoking one of the call processing primitives.

28. The call processing method according to claim 27, the data structures include groups of parameters that define features particular to the call processing messaging application service including global service parameters, subscriber specific parameters, message handling topics, call processing variables, and voice prompts.

29. The call processing method according to claim 28, the providing step further comprising:
   initializing the one or more state tables and the groups of parameters;
   parsing the one or more state tables into a state table file and the groups of parameters into parameter files; and
   linking the parsed state table file and parameter files to the call processing service record.

30. The call processing method according to claim 29, wherein the request is processed by the call processing primitives accessing the call processing service record.

31. The call processing method according to claim 25, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

32. The call processing method according to claim 25, wherein the messaging application services include a telephony channel service used to determine a subscriber identity associated with a subscriber making a call request for a messaging application service followed by a messaging service specifically subscribed to by the identified subscriber.

33. A system for processing calls from an external telephony environment employing a hierarchy of software managers, comprising:
   a telephony front end manager for interfacing call processing messaging application service requests from the external telephony environment and providing call processing messaging application service responses to the external telephony environment and providing call processing messaging application service responses to the external telephony environment;
   plural telephony channel managers, each telephony channel manager;
      (a) managing an assigned communication channel in the external telephony environment,
      (b) transmitting call processing messaging application service requests for the assigned communication channel received from the telephony front end manager, and
      (c) returning call processing service responses for the assigned communication channel to the telephony front end manager; and
   a call processing manager for receiving call requests from the telephony channel managers, executing a logical sequence of call processing operations to perform a requested call processing messaging application service, and providing responses to call processing messaging application service requests to the telephony channel managers.

34. The call processing system according to claim 33, wherein the call processing manager includes:
   a service state table that corresponds to a sequence of logical states for providing the requested call processing messaging application service, and
   means for executing the corresponding service state table, wherein execution of each logical state invokes at least one call processing operation for transitioning to the next state in the state table.

35. The call processing system according to claim 33, wherein each call processing request received on a communications channel is assigned a telephony channel manager responsible for managing that communications channel.

36. The call processing system according to claim 33, wherein the telephony front end manager includes plural controllers for interfacing with specific channel processing hardware.

37. The call processing system according to claim 33, wherein the telephony front end manager includes servers for interfacing the call processing system with specific channel processing hardware.

38. The call processing system according to claim 33, wherein each of the telephony front end, telephony channel, and call processing managers operate independently of operational details of the other managers in the hierarchy.

39. The call processing system according to claim 33, further comprising:
   hardware-specific controllers for passing incoming call events to the telephony front end controller,
   wherein the telephony front end controller analyzes an incoming call event, identifies a channel corresponding to the incoming call event, and sends a call processing messaging application service request independent of the hardware-specific controllers to the telephony channel manager responsible for the identified channel.

40. The call processing system according to claim 39, wherein the telephony channel manager responsible for the identified channel requests the call processing manager to execute the requested call processing messaging application service.

41. The call processing system according to claim 33, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

42. The call processing system according to claim 33, wherein the messaging application services include a telephony channel service used to determine a subscriber identity associated with a subscriber making a call request for a messaging application service followed by a messaging service specifically subscribed to by the identified subscriber.

43. A method of building a call processing system, comprising:
   defining requested call processing messaging application services in response to subscriber calls;
   defining sets of parameters for different types of call processing messaging application services and for different subscribers,
   establishing a set of call processing primitives for performing the call processing messaging application services, each primitive performing a single operation on one of the parameters, and returning a result when the primitive is executed;
   establishing different types of call processing parameters; and
   setting up service state tables using the call processing primitives and different types of call processing parameters as building blocks, each call processing primitive having only one of the established call processing parameters as an argument upon which the call processing primitive operates and each service state table corresponding to a sequence of logical states for providing a requested call processing messaging application service, wherein operation of each logical state in each service table executes one or more primitives for transitioning to a next state and wherein each call processing primitive operates on the one established call processing parameter independent of the other established call processing parameters.

44. The method of building a call processing system according to claim 43, wherein the messaging application services include one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

45. The method of building a call processing system according to claim 43, wherein the messaging application services include a telephony channel service used to determine a subscriber identity associated with a subscriber making a call request for a messaging application service followed by a messaging service specifically subscribed to by the identified subscriber.

46. The method of building a call processing system according to claim 43, wherein the different types of call processing parameters include global service parameters corresponding to a messaging service and independent of a particular subscriber of the communications services, subscriber specific service parameters, general purpose auxiliary variables, message handling topics used in accessing and retrieving messages in the messaging system, and voice prompts activated by executing a corresponding call processing primitive.

47. A call processing system for processing calls received from an external telecommunications network, comprising:
   a message handling system;
   an external telecommunications network interface for receiving a call request for a messaging service from a party connected to the external telecommunications network; and
   a call processor having plural call processing layers for receiving the call request from the external telecommunications network interface at one call processing layer and executing a logical sequence of call processing operations defined by a state table configured to service the call request for a messaging service in another call processing layer including accessing resources of the message handling system to respond to the call request for a messaging service, wherein the state table is constructed using call processing primitives and different types of call processing parameters, each call processing primitive performing a single call processing operation.

48. The call processing system according to claim 47, wherein the call processor processes the call request for a messaging service based on the party making the call request independent of other calls or parties associated with the call request.

49. The call processing system according to claim 47, wherein the call processing layer includes plural channel managers, each channel manager being assigned to handle a call request from an individual party over a particular communications channel.

50. The call processing system according to claim 49, wherein the another call processing layer includes a call processing manager that performs a call processing messaging application service in response to the call request.

51. The call processing system according to claim 47, wherein when the call processor executes the states table, each call processing primitive selects a party as an object.

52. The call processing system according to claim 47, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

53. The call processing system according to claim 47, wherein the messaging application services include a telephony channel service used to determine a subscriber identity associated with a subscriber making a call request for a messaging application service followed by a messaging service specifically subscribed to by the identified subscriber.

54. A system for processing calls from an external telecommunications network, comprising:
   a telephony interface for interfacing with and receiving calls corresponding to associated messaging application service requests from the external telecommunications network;
   a call processing manager for generating service state tables using call processing primitives and different types of call processing parameters as building blocks, receiving messaging application service requests from the telephony interface, executing one of the service state tables to perform a requested messaging application service, and returning the results of the performed messaging application service to the telephony interface, each call processing primitive performing a single call processing operation, the call processing manager including:
   a phrase table for storing voice prompts associated with a messaging application request, each voice prompt being defined by phrases stored in the phrase table, wherein the call processing manager retrieves one or more selected phrases from the phrase table and activates a desired voice prompt in response to execution of a call processing primitive.

55. The system according to claim 54, wherein phrases in the phrase table are in different languages.

56. The system according to claim 54, wherein the phrases include speech phrases, silence phrases, or tone phrases.

57. The system according to claim 56, wherein the phrases include one or more compound phrases which combine other types of phrases to generate a more complex voice prompt.

58. The system according to claim 54, wherein the phrases include simple phrases consisting of sentences, phrases or words.

59. The system according to claim 58, wherein the phrases include a silence phrase that specifies a predetermined amount of silence in a voice prompt to permit time for a response to that prompt.

60. The system according to claim 58, wherein the phrases include a tone phrase that specifies a frequency, amplitude and duration.

61. The system according to claim 60, wherein the phrases include simple phrases consisting of sentences, phrases, or words, compound phrases which combine different types of phrases, and tabular phrases which combine simple and compound phrases.

62. The system according to claim 54, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

63. The system according to claim 54, wherein the messaging application services include a telephony channel service used to determine a subscriber identity associated with a subscriber making a call request for a messaging application service followed by a messaging service specifically subscribed to by the identified subscriber.

64. A call processing method for processing subscriber communications in a messaging system to provide a variety of different communication services including messaging application services, comprising the steps of:

(a) establishing a set of call processing primitives for use in performing each messaging application service, each call processing primitive performing a single call processing operation;

(b) establishing a call processing record for each messaging application service;

(c) defining each messaging application service's call processing record based on the set of call processing primitives using different service components including (1) one or more of global service parameters which correspond to a messaging service but are not specific to a particular subscriber of the communications services, (2) subscriber specific parameters corresponding to a specific subscriber accessed by one of the call processing primitives, (3) general purpose, auxiliary variables, (4) message handling topics used by one of the call processing primitives in accessing and retrieving messages in the messaging system, and (5) voice prompts activated by executing a corresponding call processing primitive; and (d) executing the set of call processing primitives which operate on corresponding ones of the different service components.

65. The call processing method according to claim 64, wherein the messaging application services relate to one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

66. The call processing method according to claim 64, wherein the messaging application services include a telephony channel service used to determine a subscriber identity associated with a subscriber making a call request for a messaging application service followed by a messaging service specifically subscribed to by the identified subscriber.

67. A call processing method for building a call processor in a message handling system coupled to a telecommunications network, comprising:

defining call processing services including messaging application services;

defining sets of parameters for different types of call processing services and different subscribers;

establishing a set of call processing primitives for performing the call processing services, each primitive performing a single operation on one of the parameters and returning a result when the primitive is executed;

establishing different types of call processing parameters, each parameter not being linked with the other parameters;

setting up service state tables using the call processing primitives as building blocks, each service state table corresponding to a sequence of logical states for providing a requested one of the call processing services, wherein operation of each logical state in each service table executes one or more primitives for transitioning to a next state;

defining plural phrase tables, each phrase table including plural voice prompts associated with a call processing request, wherein each voice prompt is defined by one or more phrases stored in the phrase table and corresponds to one of the call processing primitives; and retrieving one or more selected phrases from the phrase table and activating a desired voice prompt in response to execution of a corresponding one of the call processing primitives.

68. The call processing method in claim 67, wherein each voice prompt is defined as a combination of one or more building blocks including spoken sentences, phrases or words.

69. The call processing method in accordance with claim 67, wherein the phrases include tabular phrases that return a numeric value used as an index to the table for determining a next phrase to be executed.

70. The call processing method according to claim 67, wherein the phrases include one or more compound phrases.

71. The call processing method according to claim 67, wherein plural phrase tables are defined in accordance with a phrase category.

72. The call processing method in accordance with claim 71, wherein the phrase category corresponds to language such that each phrase table represents a different language.

73. The call processing method in accordance with claim 71, wherein the phrase category is user expertise such that a first set of prompts is used for a lower level of expertise and a second set of prompts is used for a higher level of expertise.

74. The call processing method according to claim 67, wherein the different types of call processing parameters include global service parameters corresponding to a general messaging service and independent of a particular subscriber of the communications services and subscriber specific service parameters.

75. The call processing method according to claim 67, wherein the messaging application services include one or more of the following: voice mail, voice messaging, facsimile mail, facsimile messaging, radio paging, interactive voice response, automatic call distribution, operator services, short message services, intelligent network service integration, electronic mail, electronic document interchange, audiotext, and automated attendant.

76. The call processing method according to claim 67, wherein the messaging application services include a telephony channel service used to determine a subscriber identity associated with a subscriber making a call request for a messaging application service followed by a messaging service specifically subscribed to by the identified subscriber.

* * * * *